United States Patent [19]
Oldfield et al.

[11] Patent Number: 5,856,989
[45] Date of Patent: Jan. 5, 1999

[54] METHOD AND APPARATUS FOR PARITY BLOCK GENERATION

[75] Inventors: Barry J. Oldfield; Mark D Petersen, both of Boise, Id.

[73] Assignee: Hewlett-Packard Company, Palo Alto, Calif.

[21] Appl. No.: 696,220

[22] Filed: Aug. 13, 1996

[51] Int. Cl.[6] .................................................. G06F 11/10
[52] U.S. Cl. ........................................... 371/49.2; 371/48
[58] Field of Search ................................. 371/49.2, 49.1, 371/48

[56] References Cited

U.S. PATENT DOCUMENTS

| | | | |
|---|---|---|---|
| 4,546,475 | 10/1985 | Sharpless et al. | 371/49 |
| 4,761,785 | 8/1988 | Clark et al. | 371/51 |
| 4,989,206 | 1/1991 | Dunphy, Jr. et al. | 371/10.1 |
| 5,123,019 | 6/1992 | Boecker et al. | 371/51.1 |
| 5,195,100 | 3/1993 | Katz et al. | 371/66 |
| 5,206,943 | 4/1993 | Callison et al. | 395/425 |
| 5,289,418 | 2/1994 | Youngerth | 365/201 |
| 5,345,565 | 9/1994 | Jibbe et al. | 395/325 |
| 5,677,931 | 10/1997 | Okuyama et al. | 375/260 |
| 5,742,625 | 4/1998 | Munetoh et al. | 371/49.2 |

*Primary Examiner*—Phung M. Chung
*Attorney, Agent, or Firm*—Gregg W. Wisdom

[57] ABSTRACT

An apparatus for generating parity blocks in a RAID system includes a PRAM control unit, two parity memories each coupled to the PRAM control unit, and in several alternative embodiments, a valid contents memory for tracking the contents of the parity memories. Parity blocks are generated by performing an exclusive OR operation between all of the corresponding data words in the data blocks of the stripe. Results of the exclusive OR operations are alternately stored in the two parity memories. Alternately dedicating one parity memory for storing the results of the exclusive OR operation which will be performed and one parity memory from which the results of the previous exclusive OR operation are loaded allows computation of the parity block to be performed at a higher rate than configurations which use a single parity memory. In a first embodiment of the PRAM control unit, a flip/flop tracks which of the two parity memories contains the valid contents. A second embodiment of the apparatus uses a valid contents memory and a top counter to support the generation of the parity block with fragmented in order transfers of data blocks in the stripe. The preferred embodiment of the apparatus for generating parity blocks allows generation of parity blocks while data block fragments are transferred over the bus without regard to order. The preferred embodiment employs a set of first access bits stored in the valid contents memory to indicate to which storage locations in the parity memories data words have previously been stored.

20 Claims, 13 Drawing Sheets

METHOD AND APPARATUS FOR PARITY BLOCK GENERATION

FIELD OF THE INVENTION

The present invention relates to Redundant Arrays of Independent Disks (RAID) systems. More particularly, the present invention relates to the generation of the parity block in the RAID system.

BACKGROUND OF THE INVENTION

A RAID system is an organization of data in an array of data storage devices, such as hard disk drives, to achieve varying levels of data availability and system performance. Data availability refers to the ability of the RAID system to provide data stored in the array of data storage devices even in the event of the failure of one or more of the individual data storage devices in the array. A measurement of system performance is the rate at which data can be sent to or received from the RAID system.

Of the five basic architectures developed for RAID systems, RAID 1 and RAID 5 architectures are most commonly used. A RAID 1 architecture involves an array having a first set of data storage devices with a second set of data storage devices which duplicates the data on the first set. In the event of the failure of a data storage device, the information is available from the duplicate device. The obvious drawback of this RAID system implementation is the necessity of doubling the storage space.

A RAID 5 architecture provides for redundancy of data by generating parity data. Each of the data storage devices are segmented into a plurality of units of data, known as blocks, containing equal numbers of data words. Blocks from each data storage device in the array covering the same data storage device address range form what are referred to as "stripes". A parity block is associated with each stripe. The parity block is generated by performing successive exclusive OR operations between corresponding data words in each of the data blocks. Changes to data blocks in a stripe necessitates re-computation of the parity block associated with the stripe. In a RAID 4 system, all parity blocks are stored on a single unit in the array. As a result, the data storage device containing the parity blocks is accessed disproportionately relative to the other data storage devices in the array. To eliminate the resulting constriction of data flow in a RAID 4 system, a RAID 5 architecture distributes the parity blocks across all of the data storage devices in the array. Typically in a RAID 5 system, a set of N+1 data storage devices forms the array. Each stripe has N blocks of data and one block of parity data. The block of parity data is stored in one of the N+1 data storage devices. The parity blocks corresponding to the remaining stripes of the RAID system are stored across the data storage devices in the array. For example, in a RAID 5 system using five data storage devices, the parity block for the first stripe of blocks may be written to the fifth device; the parity block for the second stripe of blocks may be written to the fourth drive; the parity block for the third stripe of blocks may be written to the third drive; etc. Typically, the location of the parity block in the array for succeeding blocks shifts to the succeeding logical device in the array, although other patterns may be used. More information detailing the architecture and performance of RAID systems can be found in the RAID Book: A Source Book for RAID Technology, by the RAID Advisory Board, 1993, the disclosure of which is incorporated herein by reference.

When data stored in the N+1 storage devices of the RAID 5 array is modified, the parity block for the stripe in which the data is located must also be modified. This modification process can occur through what is known as a "read-modify-write" sequence or a "write in place" sequence. In a read-modify-write sequence, the parity block is recomputed through a process of performing the exclusive OR operation between corresponding words of the data blocks forming the stripe.

A write in place sequence recomputes the parity block by removing the effect of the data currently contained in the storage locations which will be modified from the parity block and then adding the effect of the new data to the parity block. To perform a write in place sequence, the data presently stored in the data blocks having the storage locations which will be modified is read. The corresponding portion of the parity block of the stripe containing the storage locations which will be modified is read. The exclusive OR operation is performed between the data presently stored in the data blocks and the corresponding portion of the parity block to remove the effect of the presently stored data on the parity block. The exclusive OR operation is then performed between the new data and the result of the previous exclusive OR operation. This result is then stored on the data storage devices in the corresponding locations from which the portion of the parity block was loaded and the new data is stored in the stripe.

Efficiency considerations determine which one of these methods of parity block computation will be used. The factors used to determine which of these methods of parity block generation is most efficient vary with the configuration of the RAID system and the data blocks which are being modified. For example, if there are a large number of data storage devices which store portions of the stripe and changes have been made to data blocks which involve only a few of the data storage devices, the most efficient parity block re-computation method may be write in place. However, if a relatively large fraction of data storage devices are involved in the changes to the data blocks, the most efficient parity block re-computation method may be read-modify-write. The firmware controlling the operation of the RAID system determines the most efficient parity block re-computation method for each data transfer to the array.

Low cost RAID systems can be implemented by using software installed in the host computer system to perform the RAID system management functions. For this type of RAID system the host computer system manages the distribution of data blocks and parity blocks across an array of data storage devices and performs the parity block computation. As expected, this low cost RAID system implementation results in a significant reduction in the ability of the host computer system to perform its other data processing operations. High performance RAID systems use a dedicated controller to manage the data block and parity block storage in the array of data storage devices. For these high performance RAID systems, the host computer is able to interact with the RAID system as a single data storage unit.

Within the category of high performance RAID systems using controllers, there are low cost controllers and high performance controllers. Low cost controllers use the microprocessor on the controller to perform the parity block generation. This implementation of parity block generation makes a trade off in the performance of the RAID system controller to reduce the cost of the controller. High performance controllers utilize dedicated hardware, such as a state machine or a dedicated microprocessor, to more rapidly perform parity block generation.

The prior art dedicated hardware used in high performance controllers includes a single dedicated memory to store intermediate results used in the generation of the parity block. The process of storing a stripe of new data into the RAID system employing a read-modify-write sequence and using the parity generation logic of the dedicated hardware proceeds as follows:

1. As a data block of the stripe is transferred over the data bus of the RAID system to the data storage devices, the dedicated hardware in the RAID controller writes the data block into the single dedicated memory.
2. As data words of the next data block of the stripe are transferred over the data bus of the RAID system to the data storage devices, they are loaded into the dedicated hardware in the RAID controller.
3. As the data words of the previous step are loaded into the dedicated hardware, the corresponding data words or results of previous exclusive OR operations stored in the single dedicated memory are also loaded into the dedicated hardware.
4. An exclusive OR operation is performed using the corresponding data words as operands.
5. The result of the exclusive OR operation is written back into the single dedicated memory.
6. These steps, beginning with step 2, are repeated until all of the corresponding words of the data blocks of the stripe have undergone the exclusive OR operation.
7. The resulting newly generated parity block for the stripe is stored in the data storage devices in the array designated to hold the parity block for that stripe.

This read-modify-write method of parity block generation requires loading the intermediate results stored in the single dedicated memory into the dedicated hardware and then storing the results of the exclusive OR operation in the single dedicated memory for each exclusive OR operation performed. Computation of the parity block is done as the data stripe is transferred over the bus. Computation of the parity block using the prior art parity generation logic requires two accesses to the single dedicated memory for each data word transferred over the bus.

For RAID systems which transfer data over the data bus up to 40 MB/s, this method of parity data block generation can be performed at a rate sufficient to meet the data transfer rates of the bus. For the next generation RAID systems having data transfer rates of greater than 100 MB/s over the bus, this method of parity block generation cannot be performed sufficiently fast to allow parity block generation to occur as data stripes are transferred over the bus. Use of this method of parity block generation in the next generation of RAID systems would require a reduction in the data transfer rates of the bus. A system for generating parity blocks which will not reduce the data transfer rate performance of the bus is required to achieve optimum performance in the next generation of RAID systems.

SUMMARY OF THE INVENTION

The present invention allows for the generation of a parity block as data words are being transferred over a bus. This invention is particularly well suited to the generation of parity blocks in a redundant array storage system having high data transfer rates over the bus. Generation of parity blocks using this invention allows the redundant array storage system to operate at the maximum data transfer rates over the bus.

The present invention realizes an improvement in the rate at which parity data can be generated by using two memories to hold parity generation data words. Generation of a parity data word of a parity data block is accomplished by performing successive exclusive OR operations between data words in the data blocks of the stripe and the corresponding parity generation data words as the data words are transferred over the bus. The parity generation data words used for and resulting from each of the successive exclusive OR operations are alternately loaded from and alternately stored in corresponding locations in the two memories as successive data blocks or data block fragments are transferred over the bus. By alternately dedicating a memory for reading parity generation data words and a memory for writing parity generation data words, the time required to complete, in succession, a read access to one of the two memories and a write access to the other of the two memories for each data word transferred is less than the time required to complete, in succession, a read and a write access to a single memory for each data word transferred. This increases the rate at which generation of the parity data block can be performed.

The apparatus for generating parity data includes a first and a second parity memory coupled to a parity generation and control unit. The parity generation and control unit receives data words from the bus. During generation of the parity data, parity generation data is selectively stored to and loaded from the first and the second parity memory.

DESCRIPTION OF THE DRAWINGS

A more thorough understanding of the invention may be had from the consideration of the following detailed description taken in conjunction with the accompanying drawings in which.

DETAILED DESCRIPTION OF THE PREFERRED EMBODIMENTS

The present invention is not limited to the specific exemplary embodiment illustrated herein. In order to effectively teach the various aspects of the embodiments of the parity block generation apparatus, three embodiments will be presented. Each of the embodiments allows for successively greater parity block generation capability while becoming successively more complex. The first embodiment of the parity block generation apparatus can only support parity block generation for in order transfers of the data words in the data blocks without fragmentation of the data blocks. The second embodiment of the parity block generation apparatus supports in order transfers and fragmented transfers of data blocks. The third embodiment of the parity block generation apparatus supports parity block generation for data block transfers in arbitrary order and with fragmentation of the data blocks to the data word level.

The description of the first embodiment of the parity block generation apparatus will be discussed in the context of a simplified RAID-5 system having an array of five hard disk drives and using a PCI bus. The description of second and a third embodiment of the parity block generation unit will also be discussed in the context of a redundant array storage system using a PCI bus. However, one skilled in the art will recognize that the disclosed embodiments of the parity block generation apparatus are applicable to any system, employing one of several possible bus architectures, which would benefit from an improved rate of parity block generation. Furthermore, although the data storage devices used in the exemplary RAID systems are hard disk drives, other random access read/write data storage devices, such as RAM based memory arrays, or magneto optic storage devices may, in general, be used.

Figure 1:
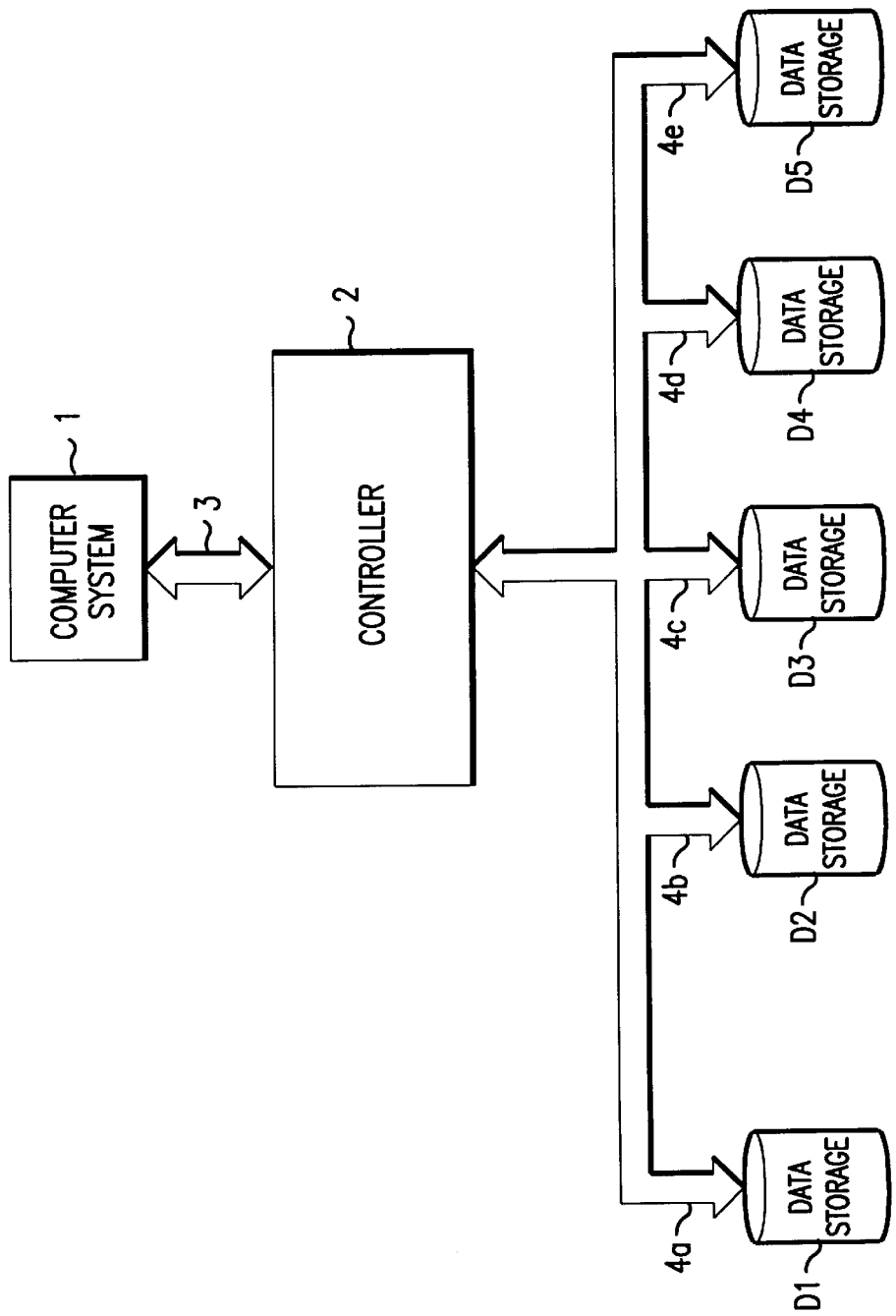
FIG. 1 is a block diagram showing the basic elements of a RAID system having five data storage devices.

Referring to FIG. 1, a simplified block diagram of a RAID-5 system is shown for the purposes of illustrating how parity blocks are distributed among the data blocks in a RAID-5 system. Computer system 1 sends and receives data and command and control signals to and from controller 2 over bus 3. Controller 2 sends and receives data and control signals to and from hard disk drives D1–D5 over buses 4a–4e. There is no requirement that bus 3 and buses 4a–4e are the same type of bus. Typically, controller 2 contains a high performance processor (not shown in FIG. 1) which manages the flow of data between hard disk drives D1–D5 and computer system 1 and performs the functions necessary to optimize the storage of data in hard disk drives D1–D5. Controller 2 includes the capability to perform DMA transfers between hard disk drives D1–D5 and computer system 1.

Figure 2:
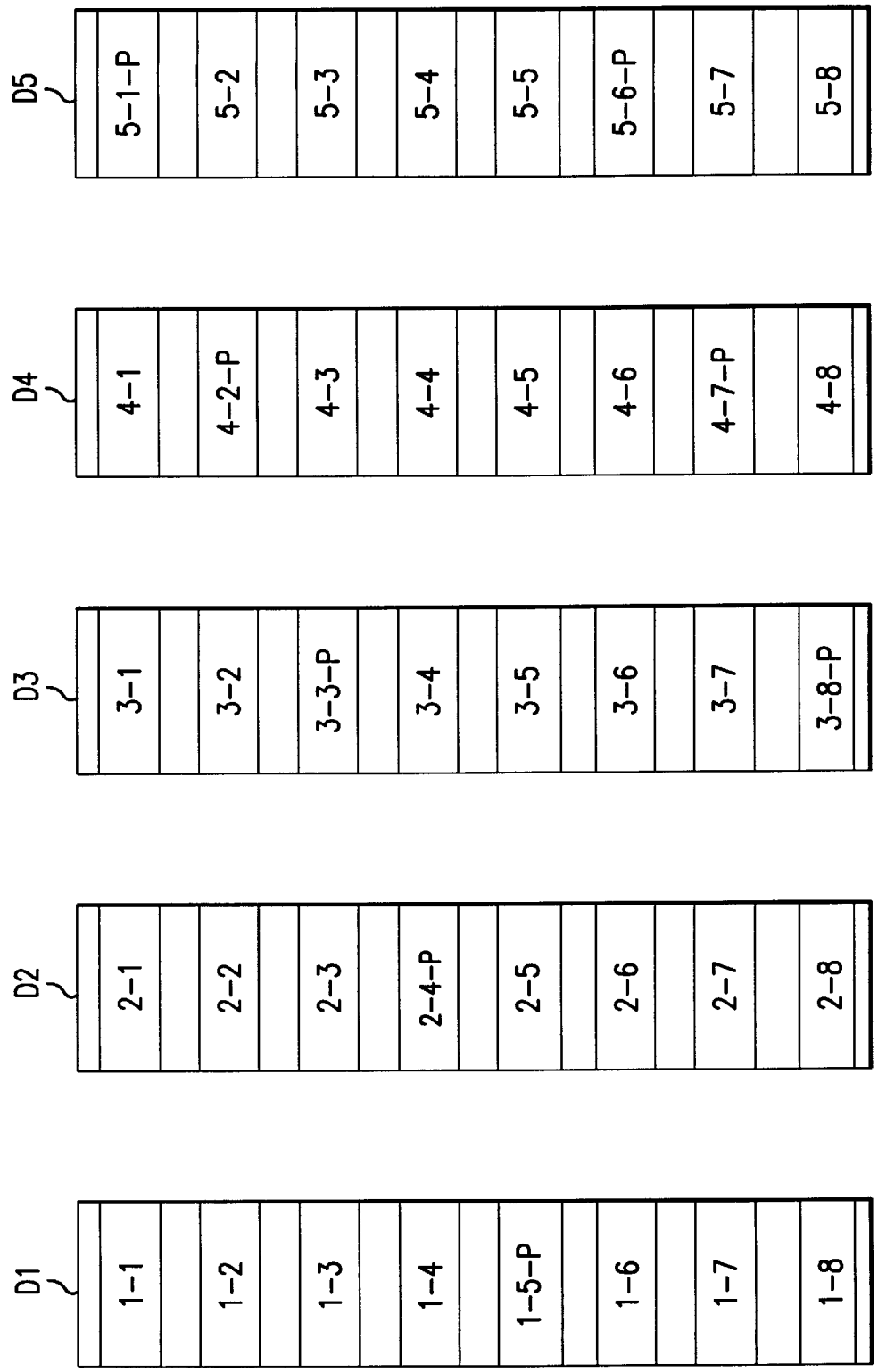
FIG. 2 is a representation of the distribution of data blocks and parity blocks across data storage devices in a simplified RAID-5 system.

FIG. 2 is a representation of the distribution of the data blocks and parity blocks across the hard disk drives in the RAID-5 system of FIG. 1. The column headings D1–D5 represent the individual hard disk drives in the array. It will be recognized that a RAID-5 system may include a greater number or a fewer number than five data storage devices. Each entry in the columns below the column headings represents the data blocks contained on the hard disk drive associated with that column. For simplicity, each hard disk drive is represented as having a storage capacity of only 8 blocks. It will be recognized that each data storage device in a RAID system may include a greater number or a fewer number than 8 blocks. The blocks are designated as "X—X", where the first "X" represents the number of the hard disk drive (1–5, corresponding to hard disk drives D1–D5) and the second "X" represents the number of the data block in the hard disk drive (1–8). A stripe is formed from a set data blocks in which one data block is stored on each of the hard disk drives. Those blocks designated as "X-X-P" represent the parity block associated with the stripe. The parity blocks are generated by performing an exclusive OR operation using the corresponding data words in all of the data blocks of the stripe. In this RAID-5 system the parity blocks are distributed across the hard disk drives in a repetitive pattern, although, in general, this is not necessary.

Figure 3:
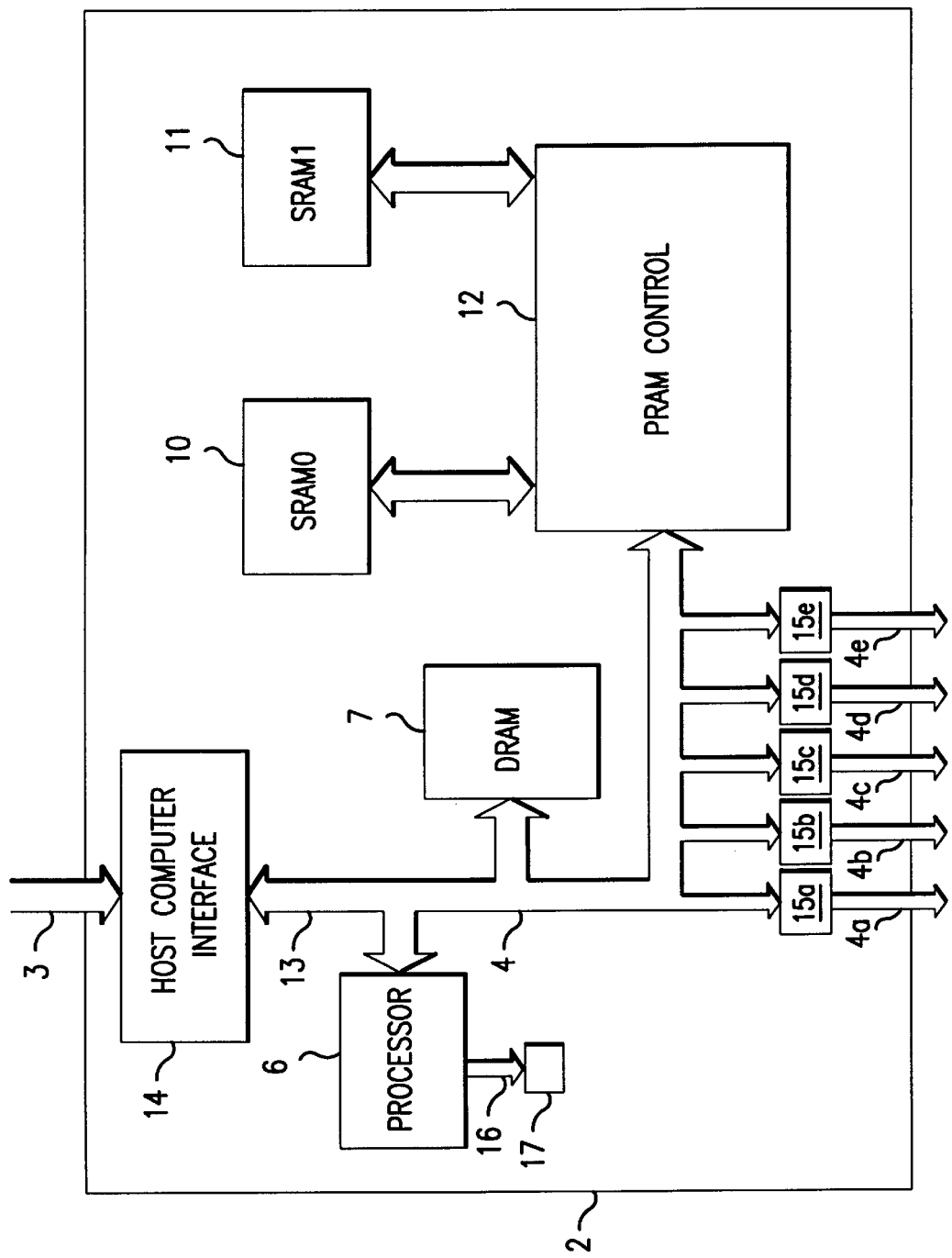
FIG. 3 is a block diagram showing the basic elements of a first embodiment of the parity block generation apparatus.

FIG. 3 shows a simplified block diagram of the controller 2 and the elements of a first embodiment of the parity block generation apparatus. Processor 6 is a high performance processor which configures the DMA chips 15a–15e for the storage and retrieval of data to and from data storage devices D1–D5. The processor 6 has a dedicated bus 16 over which it transfers data to and from DRAM memory 17. For cases in which data is to be most rapidly transferred from computer system 1 to the RAID system, DRAM memory 7 is used as a temporary storage location for the data. After this transfer is complete, processor 6 initiates the DMA transfer of data from DRAM memory 7 to data storage devices D1–D5. Data which is transferred from the RAID system to computer system 1 may be transferred directly from the data storage devices D1–D5 or from the data storage devices D1–D5 into DRAM memory 7 and then to computer system 1. First parity memory, SRAM0 10, and second parity memory, SRAM1 11, are high speed memory storage devices, such as static random access memories (SRAM), which store data blocks for use in computing parity blocks and store the intermediate results of parity block computation.

A parity generation and control unit, a first embodiment of which is PRAM control 12, includes the capability to receive commands from processor 6 over PCI bus 4, to load data words from PCI bus 4 as a data stripe is being transferred to or from data storage devices D1–D5, to transfer parity blocks to DMA chips 15a–15e, to transfer data words to and from SRAM0 10 and SRAM1 11, and perform successive exclusive OR operations. In addition, PRAM control 12 includes the capability to determine, using, for example, a flip/flop, which of memories SRAM0 10 and SRAM1 11 contains the parity generation data to be used as operands for the next exclusive OR operation performed in the computation of the parity block. It should be noted that data words will be transferred from data storage devices D1–D5 to PRAM control 12 for generation of parity data when less than a complete stripe of data has been transferred into data storage devices D1–D5. Furthermore, if a write-in-place method is used to generate the parity data block, parity data words as well as data words will be transferred from data storage devices D1–D5 to PRAM control 12.

The PCI bus specification allows any device connected to the bus to act as the bus master. Each device connected to the bus can undertake Direct Memory Access (DMA) transfers. There is no controller on the bus dedicated to monitoring and controlling bus traffic for each transfer to the array. As a result, there is not a bus controller responsible for instructing the PRAM control to begin the parity block generation as the transfer of a stripe is initiated. Therefore, in a PCI bus environment, the parity generation and control unit, indicated in FIG. 3 as PRAM control 12, must include the capability to determine when data for which parity block generation is required is being transferred, monitor the bus and load the necessary data for parity block generation as it is transferred, and respond as a slave on the PCI bus when transfer of the computed parity block is required. It should be recognized the capabilities indicated above are present in any multi-master bus architecture.

Processor 6 configures DMA chips 15a–15e to perform DMA transfers between DRAM memory 7 and data storage devices D1–D5 and configures interface 14 for DMA transfers between interface 14 and DRAM memory 7. In addition, processor 6 configures PRAM control 12 to load the data words from PCI bus 4 for parity block computation as the stripe is being transferred to or from data storage devices D1–D5. As the stripe is transferred, PRAM control 12 computes the parity block. After transfer of the stripe, processor 6 initiates the transfer of the parity block from PRAM control 12 to one of the data storage devices D1–D5.

Throughout the process of parity block generation, the memory areas of SRAM0 10 and SRAM1 11 will contain data to be used in the computation of the parity block. This data will include a data block transferred over PCI bus 4 for storage into data storage devices D1–D5, the most recent result of an exclusive OR operation, or a parity block transferred from data storage devices D1–D5 for performing a write-in-place generation of a new parity block. The flip/flop in PRAM control 12 will indicate which of memories SRAM0 10 and SRAM1 11 contain the data block, the intermediate results of the parity block computation, or the resulting parity block. The data stored in memories SRAM0 10 and SRAM1 11 will be referred to throughout this specification as parity generation data. Parity generation data words include the results of exclusive OR operations between parity generation data words stored in memories SRAM0 10 or SRAM1 11 and data words loaded from PCI bus 4. Parity generation data words also include data words loaded from PCI bus 4 and stored without modification into SRAM0 10 or SRAM1 11. The memory which contains the parity generation data of interest is referred to as having "valid contents" and as being the valid memory. Inversely, the memory which does not contain the parity generation data of interest is referred to as having "invalid contents" and as being the invalid memory.

Figure 8:
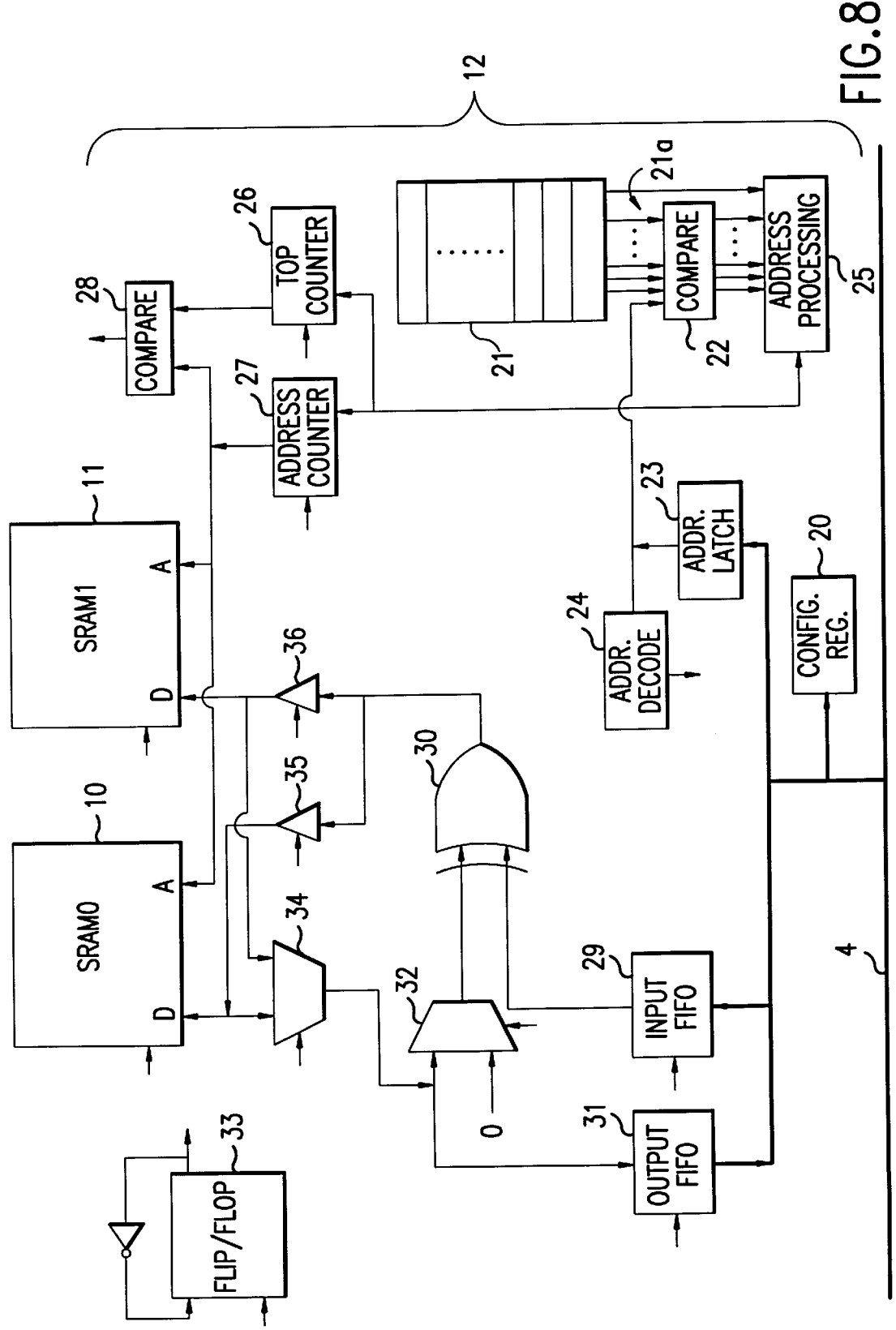
FIG. 8 is a block diagram showing the basic elements of the parity generation and control unit of the first embodiment of the parity block generation apparatus.

Shown in FIG. 8 is a block diagram of the internal functional blocks of PRAM control 12 and memories SRAM0 10 and SRAM1 11 with data inputs/outputs and address inputs labeled as "D" and "A", respectively. Configuration register set 20 represents a set of registers which store PRAM control configuration data received from processor 6 over PCI bus 4. The configuration data includes the base addresses for the parity memories 10, 11, the base addresses for the transfer table entries stored in transfer memory 21, and all the base addresses for addressable registers in PRAM control 12. Specifying the base addresses using the configuration register set 20, allows PRAM control 12 to be configured for use in systems which have different memory maps by allowing assignment of the base addresses of the addressable registers to correspond to the available address space in the memory map.

Transfer memory 21 holds n sets of values used for determining if addresses present on PCI bus 4 correspond to data blocks used for parity block generation and for generating addresses used to access the parity memories 10, 11. The n sets of values each include a bus address, a parity memory base address, and a set of compare mask bits. The n sets of values allow the generation of n parity blocks corresponding to n stripes stored in the redundant array storage system. The compare mask bits are applied to the bus address to mask bits of the bus address and define a transfer table entry range. This transfer table entry range includes all the addresses of the data words of the data blocks which form the corresponding stripe. At the beginning of the transfer of a data block in a stripe, the starting address of the data block is placed on PCI bus 4. The transfer table entry range is used to determine if the data block which will subsequently be transferred over PCI bus 4 is part of the stripe to which the transfer table entry range corresponds. The parity memory base address is the starting address of the segment of the parity memories 10, 11 used for the storage of the parity generation data words during computation of the parity data block for the corresponding stripe.

Address latch 23 loads addresses from PCI bus 4 for decoding by address decoder 24 and for use in the compare functional block 22. Address decoder 24 decodes the addresses in address latch 23 for use in selecting the parity memories 10, 11, the transfer memory 21, or addressable registers within PRAM control 12, for retrieval or storage of, respectively, parity generation data, transfer table data, or configuration data.

Compare functional block 22 represents the compare capability which actually exists within each of the n cells in transfer memory 21. Each of the n cells in transfer memory 21 has the capability to identify when a match exists between the transfer table entry range and the data block starting address stored in address latch 23. This allows the simultaneous determination of a match between the transfer table entry range and the data block starting address in each of the n cells. Performing the check for a match simultaneously, instead of sequentially, allows the PRAM control 12 to begin the computation of the parity block within the time in which input FIFO register 29 has loaded only a few words, thereby reducing the necessary storage size of input FIFO 29 register. If a match is detected, one of the n outputs 21a of compare functional block 22 is asserted to indicate which one of the transfer table entries has the matching transfer table entry range. Address processing block 25 receives the n outputs from the compare functional block 22 and loads the contents of address latch 23 and the parity memory base address, corresponding to the asserted output, from the transfer memory 21. The lower order bits of the address in address latch 23 are combined with the parity memory base address to generate an address which addresses the appropriate location in the segment of the parity memories 10, 11 corresponding to the stripe for which the parity data block will be generated. This address is loaded into the parity memory address counter 27. As the data words of the block are transferred, the parity memory address counter 27 is incremented to point to the parity memory 10, 11 address for storage of the parity generation data word corresponding to the next data word to be transferred over PCI bus 4.

The data words of the first data block transferred in the stripe are stored in the parity memory 10, 11 indicated as having invalid contents. Data words of the subsequent data blocks transferred undergo an exclusive OR operation with the corresponding parity generation data words previously stored before storage in the parity memory 10, 11 indicated as having invalid contents. A method is required for tracking which locations in the segment of parity memories 10, 11, corresponding to the stripe being transferred, have been previously loaded with data words from the first data block transferred. Top counter 26 serves this purpose. Before transfer of the stripe begins, top counter 26 is loaded with a value corresponding to the parity memory base address associated with the stripe. This value is stored with each of the n sets of values stored in transfer memory 21. As the data words of the first data block in the stripe are transferred and stored in the appropriate parity memory, the top counter 26 is incremented. The top counter 26 indicates locations in the parity memories 10, 11 in which data words have been previously stored. Locations in parity memories 10, 11 with addresses less than the corresponding value in the top counter 26 have been previously loaded with data words. Compare functional block 28 determines if the parity memory address counter 27 has a value equal to the value of the top counter 26 by comparing the values in the counters.

If transfer of the stripe is suspended while another stripe is transferred, the value in the top counter 26 is stored in the transfer memory 21 and reloaded when transfer of the stripe resumes.

Input FIFO 29 holds data words loaded from PCI bus 4 until it is necessary to send them to XOR block 30 to perform a bitwise exclusive OR operation between the data words and parity generation data words or a digital value of 0. Output FIFO 31 holds parity block words until they are sent over PCI bus 4 to DMA chips 15a–15e. If the parity memory address counter 27 has a value equal to that of the top counter 26 during generation of the parity block, a control output from compare functional block 28 directs multiplexer 32 to select a digital value of 0 for performing an exclusive OR operation with a data word from input FIFO 29. Performing an exclusive OR operation with a digital value of 0 as an operand leaves the data word unchanged. Each data word of the first data block transferred in the stripe is stored unchanged in one of the parity memories 10, 11. This function could be accomplished in an alternative manner by using a multiplexer to bypass XOR block 30 if the parity memory address counter 27 has a value equal to that of top counter 26. If the parity memory address counter 27 has a value less than the value of the top counter 26, the control output of the compare functional block 28 directs multiplexer 32 to select the parity generation data word accessed from one of the parity memories 10, 11 for input into XOR block 30.

Flip/flop 33 represents the set of n flip/flops each associated with one of the n sets of transfer table entries. Each of the n flip/flops 33 is used to track the parity memory which contains the valid parity generation data for the corresponding stripe. The output of the flip/flop 33 is used to control the connection of one of the inputs of multiplexer 34 to its output. During generation of the parity block, a parity generation data word accessed from the valid parity memory is directed to the input of the XOR block 30 for use as an operand in performing an exclusive OR operation with a data word loaded from PCI bus 4. The result of the exclusive OR operation, whether a parity generation data word or a digital value of zero was used as one of the operands, is stored in the parity memory indicated as having invalid contents by flip/flop 33. The parity memory address counter 27 provides the address in the parity memory to which the result of the exclusive OR operation is stored. The output of flip/flop 33 is used to control selection of one of the buffers 35, 36 to direct the result to the invalid parity memory for storage. After the transfer of a data block is complete, the flip/flop 33 is toggled to indicate the parity memory 10, 11 which contains the valid contents.

Each of the unterminated arrow segments entering the depicted elements of the system represent a control signal. The techniques used to design the hardware to implement the functions of PRAM control 12 as diagramed in FIG. 8, are well known to one skilled in the art of digital design.

Figure 4A:
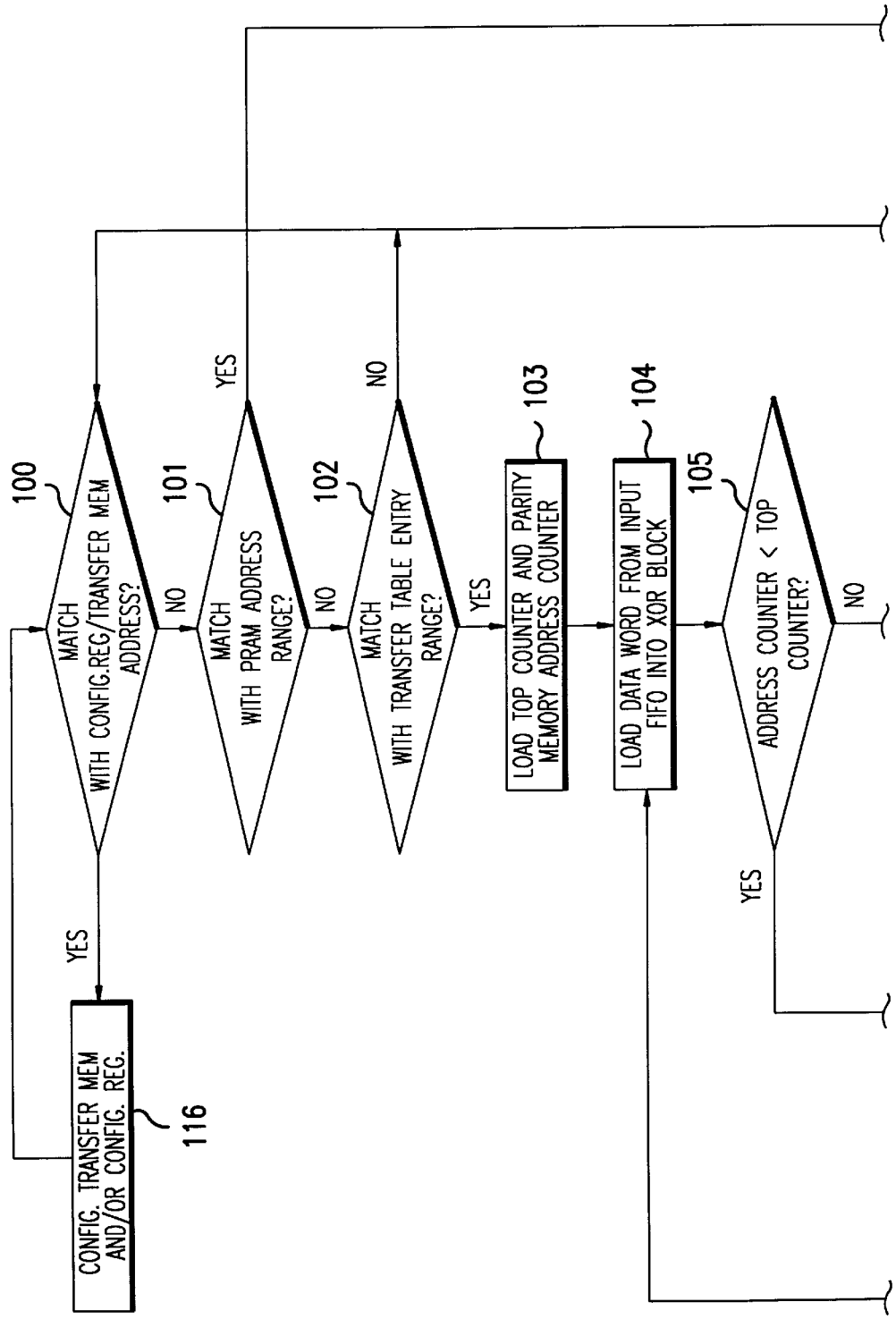
FIG. 4 is a flow chart of a first method of parity block generation utilizing the first embodiment of parity block generation apparatus.
Figure 4B:
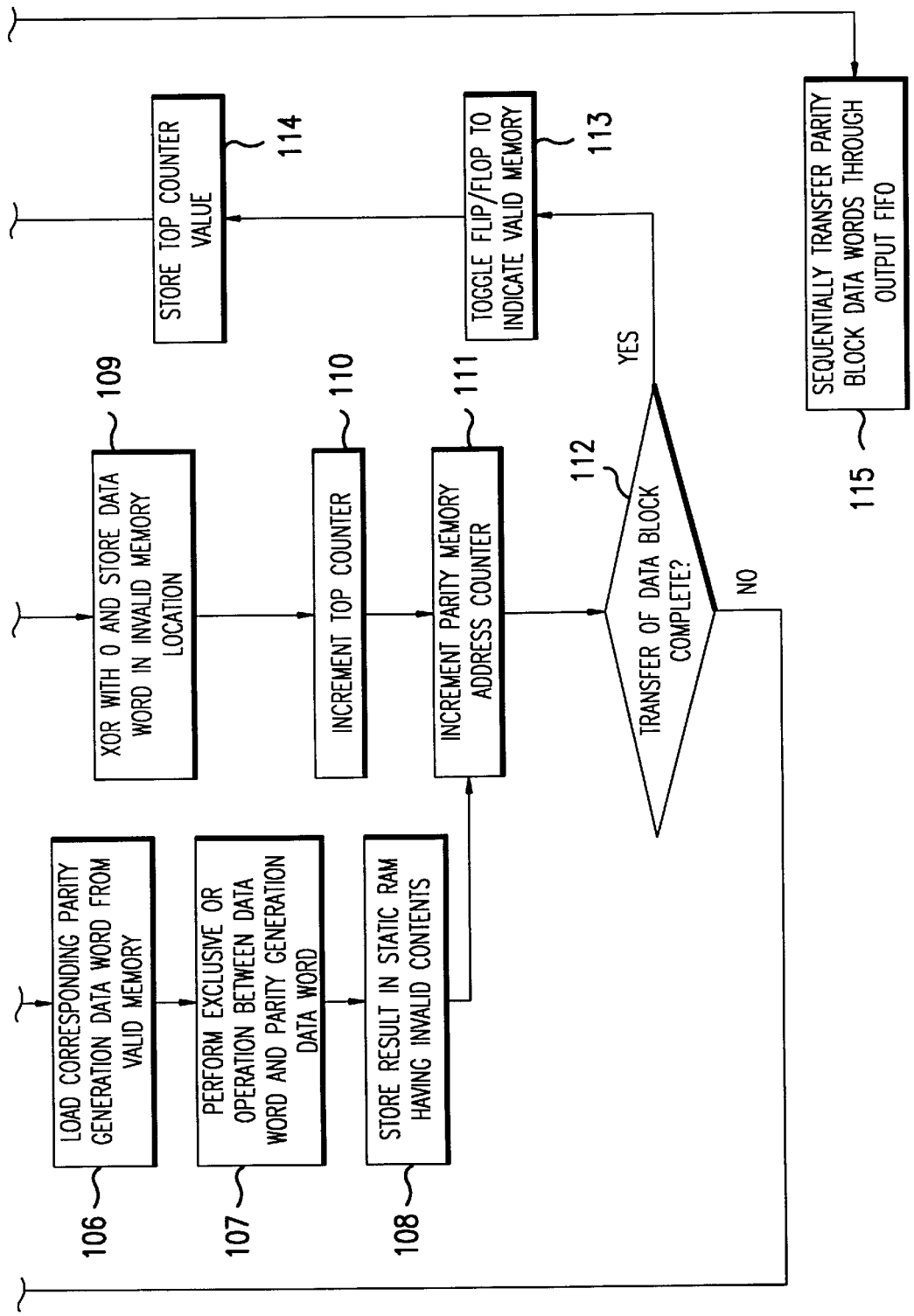

A first method of parity block generation using the hardware of FIG. 3 and FIG. 8 is shown in the flow chart of FIG. 4. This first method applies to the case in which a stripe of data is transferred from DRAM memory 7 to the data storage devices D1–D5. In addition, the transfer of the data words of the data blocks must be done so that data words having consecutive addresses are transferred consecutively (an in order transfer) without fragmentation (fragmentation refers to the case in which the transfer consists of less than a complete block of data) and the data blocks are transferred sequentially. Interleaved transfers of the data blocks is not allowed.

Initially, processor 6 determines 100 if transfer memory 21 or configuration register set 20 in PRAM control 12 are being addressed. If either or both of transfer memory 21 and configuration register set 20 are addressed, as applicable, transfer memory 21 is configured 116 by loading the n sets of data each containing a bus address value, a set of mask bits, a parity memory base address, which also serves as an initial top counter value, and configuration register set 20 is configured 116 by loading with configuration data. Then, control is returned to step 100 to check the next address placed on PCI bus 4. If it is determined in step 100 that neither transfer memory 21 or configuration register set 20 have been addressed, then PRAM control 12 determines 101 if the address which appears on PCI bus 4 corresponds to an addresses of a location within parity memories 10, 11. If a match is not detected, then PRAM control 12 determines 102 if the addresses which appear on PCI bus 4 are within a transfer table entry range. If a match is not detected control returns to step 100 and this loop is repeated. If a match is detected, PRAM control 12 loads 103 the top counter 26 and parity memory address counter 27 with the appropriate values. Then, PRAM control 12 loads 104 the data word from input FIFO register 29 into XOR block 30. Input FIFO register 29 loads data words as they are transferred over PCI bus 4 to one of DMA chips 15a–15e. Data words are pre-loaded into input FIFO register 29 at the start of a transfer before a match is detected so that data words will be available to begin computation of the parity data when a match is detected. If no match is detected between the transfer table entry range and the address appearing on PCI bus 4 prior to the start of the data word transfers, the data words will be discarded.

Next, PRAM control 12 determines 105 if one of the pair of corresponding locations in the parity memories corresponding to the data word in XOR block 30 has had data words previously stored in it. This is done by comparing the value in parity memory address counter 27 to the value in top counter 26 using the compare functional block 28. If the parity memory address counter value is less than the top counter value, this indicates that data words have been previously stored in that location. If the value in parity memory address counter 27 is equal to the top counter value, the data word undergoes an exclusive OR operation with a digital value of 0 and is stored 109 in the invalid memory location. Next, the top counter 26 is incremented 110.

If the parity memory address counter value is less than the top counter value, the corresponding parity generation data word is loaded 106 from the valid memory. Then, an exclusive OR operation is performed 107 using the parity generation data word and the data word as operands. The result of the exclusive OR operation is stored 108 in the location in the invalid memory location corresponding to the location of the parity generation data word loaded from the valid memory.

After either incrementing 105 the top counter 26 or storing 108 the result of the exclusive OR operation, the parity memory address counter 27 is incremented 111 to point to the next pair of locations within parity memories 10, 11 used to store and load parity generation data words. Then, PRAM control 12 determines 112 if the transfer of the data block is complete by checking input FIFO register 29. If it is not complete, the control is returned to step 104. If it is complete, the flip/flop 33 is toggled 113 to indicate which of the two parity memories 10, 11 is now the valid memory and then the top counter value is stored 114 in transfer memory 21.

Next, control is returned to step 100 to determine if the transfer memory 21 or configuration register set 20 are addressed for configuration, the parity memories 10, 11 are addressed, or if the next data block starting address is placed on PCI bus 4. If the parity memories 10, 11 are addressed for a read operation, parity block data words are sequentially transferred 115 through the output FIFO register 31.

This first method of parity block generation can be performed more rapidly than prior art methods which use a single memory to hold the parity generation data. This method alternately uses one of SRAM0 10 or SRAM1 11 as the memory from which parity generation data is loaded and the other as the memory to which the results of the exclusive OR operation are stored. Using this method requires a single access to each of SRAM0 10 and SRAM1 11 for each exclusive OR operation performed. The prior art method, which uses a single memory, requires a read access and a write accesses to the single memory for each exclusive OR operation performed. As the bus to the single memory switches from a read state to a write state or write state to a read state, the bus must be brought to a tristate condition to avoid contention between devices connected to the bus. The delay required for the bus to reach this tristate condition is incurred on every access to the single memory. The time required to reach the tristate condition can be longer than the access time of the memory device. This delay significantly reduces the rate at which the parity block generation can be performed in the prior art implementations. By using two memories alternately dedicated to loading and storing parity generation data words on successive transfers of data blocks, the delay for the tristate condition is incurred only between transfers of the data blocks. Thus, there is a large increase in the rate at which the parity data block can be generated by using two memories.

There is an additional benefit, with respect to the rate at which the parity data block can be generated, obtained by using two memories. With a single memory, the total time required to perform a read access followed in succession by a write access equals the sum of the read access time, the write access time, and the delay for the tristate condition. Because two separate memories are used in the embodiments of the apparatus for parity block generation, the performance of the read access and the write access can be pipelined so that the total time required to perform both the read access and the write access is less than the sum of the read access time and the write access time. In fact, by using the read access to pre-fetch the parity generation data word required for the next exclusive OR operation to be performed during the time in which the write access is performed for the current exclusive OR operation result, the sum of the read access time and the write access time can be reduced to one half of the sum of the read access time and the write access time for the implementation which uses a single parity memory.

The latest generation of RAID systems will also use a Peripheral Component Interface (PCI) bus. The generation of parity blocks in a PCI environment which supports fragmented transfers of data blocks and/or not in order transfers presents a unique set of problems which must be resolved. PRAM control 62 of FIG. 5 must have the capability, in general, to handle the data blocks in an arbitrary transfer order and transfer size, and to support parity block generation in an environment in which the transfer of blocks can be fragmented down to individual words. This is a considerable expansion in the capabilities of the parity generation and control unit over those required for operation of the system of FIG. 3.

Figure 5:
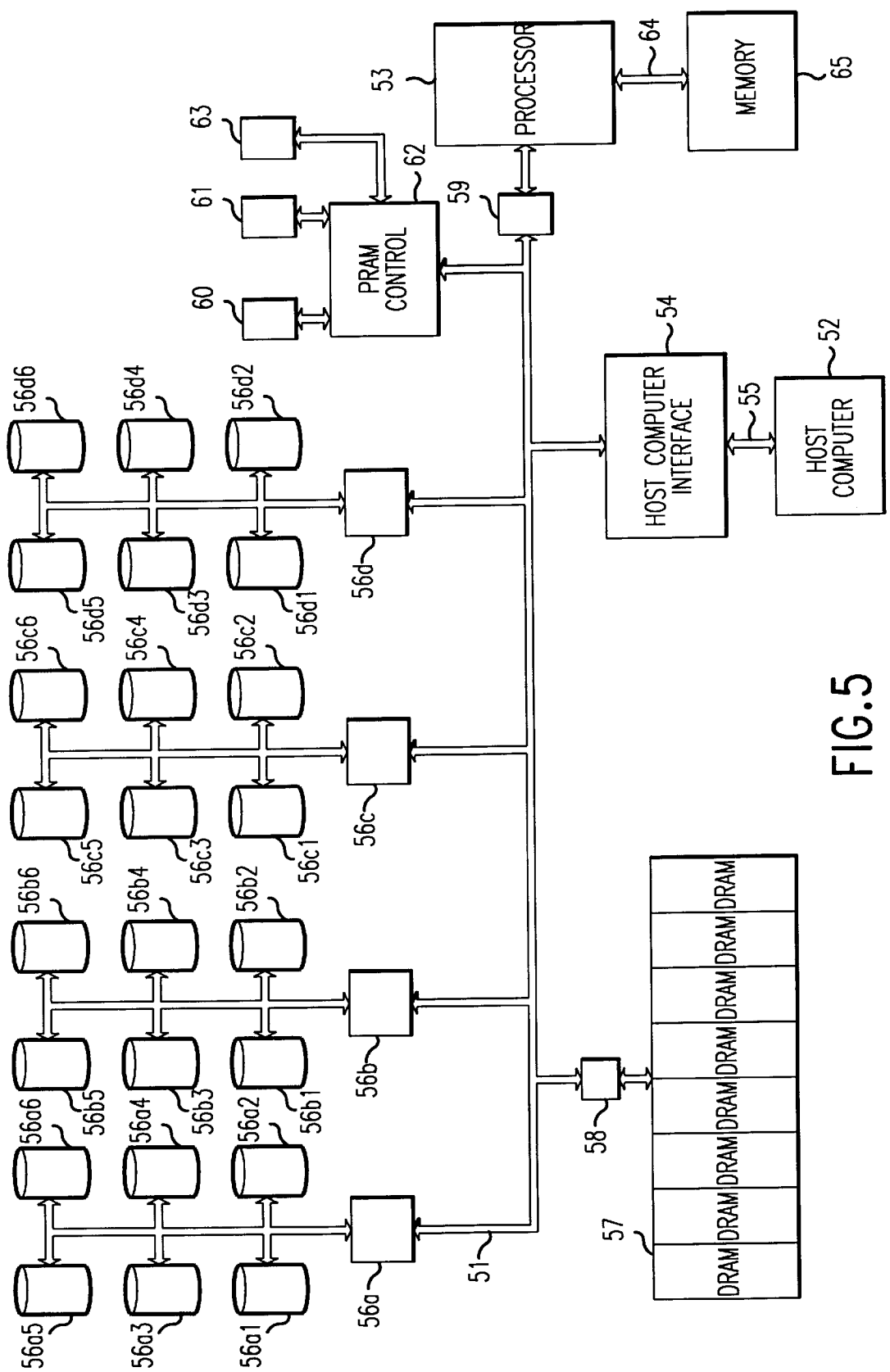
FIG. 5 is a block diagram showing the basic elements of a second embodiment of the parity block generation apparatus in a PCI environment.

Shown in FIG. 5 is a redundant array storage system which uses an internal PCI bus 51. The data path of the PCI bus 51 is typically 32 bits or 64 bits wide. Processor 53 is a high performance processor, such as a RISC based processor, which provides control of the various functions of the storage system necessary to accomplish optimization of the system performance parameters. Processor 53 is interfaced to the PCI bus 51 through the bridge 59. Processor 53 transfers data between dedicated memory 65 over processor bus 64. Host computer interface 54 handles the communication between host computer 52 and the PCI bus 51. The bus 55 connecting host computer 52 and host computer interface 54 may be any of the bus types commonly used by computer systems to communicate with peripheral devices.

The exemplary storage system of FIG. 5 includes four storage device array controllers 56a–56d which connect to the PCI bus 51. Each of these storage device array controllers 56a–56d manages the storage and retrieval of data to and from the associated group of data storage devices 56a1–56d6. An array of DRAM 57 and an associated memory controller 58 are included in the storage system. The fast access time, relative to the array of data storage devices 56a1–56d6, of the DRAM array 57, allows for improved data transfer rates between host computer 52 and the storage system. All data transferred from host computer 52 to the storage system is stored into DRAM array 57 to minimize the time required for the host to perform the transfer. Depending upon the frequency of the access to the data, the storage system will move the data into data storage devices 56a1–56d6. Data blocks which are frequently accessed by the host computer 52 are cached into DRAM array 57. When data is transferred from data storage devices 56a1–56d6 to the host computer 52, a portion of the data is first loaded into DRAM array 57. As the data is transferred from the DRAM array 57 to the host computer 52, additional data is transferred from data storage devices 56a1–56d6 to DRAM array 57. Although the storage system of FIG. 5 is shown using four storage device array controllers 56a–56d and six data storage devices for each of the storage device array controllers, one skilled in the art will recognize that a storage system may be implemented with a greater or lesser number of device array controllers and data storage devices.

Each of the storage device array controllers 56a–56d and the memory controller 58 have the capability of initiating DMA transfers between the associated data storage devices 56a1–56d6 and DRAM array 57 using PCI bus 51. These DMA transfers are accomplished without the direct intervention of processor 53. The DMA transfer of data to data storage devices 56a1–56d6 complicates the parity block generation by PRAM control 62. Included in FIG. 5 is a second embodiment of the parity block generation apparatus having a PRAM control unit 62. As was the case for the system of FIG. 3, because processor 53 does not control all of the transfers to data storage devices 56a1–56d6, it does not initiate PRAM control 62 to begin parity block generation as transfer of a stripe from DRAM array 57 to data storage devices 56a1–56d6 occurs. PRAM control 62 must possess the capability to monitor transfers on PCI bus 51, determine which transfers require PRAM calculations, and perform, accordingly, the necessary parity block generation operations. Furthermore, because of the operating capabilities of the storage system, PRAM control 62 must, in general, be able to accomplish the parity block generation operation on fragmented blocks of arbitrary size transferred in any order.

The explanation of the generation of the parity blocks by PRAM control 62 in the storage system of FIG. 5 will be undertaken for two cases. First, the generation of parity blocks will be explained for a second embodiment of PRAM control 62 in which the device array controllers 56a–56d, acting as bus masters controlling the DMA transfer, perform the transfers so that consecutive words transferred over PCI bus 51 from DRAM array 57 to the array of data storage devices 56a1–56d6 have corresponding consecutive addresses. As mentioned previously, this is referred to as an in order transfer. Fragmented transfers of data blocks are possible. Second, the generation of parity blocks will be explained for a third embodiment of PRAM control 62 in which the data within a block can be transferred in an arbitrary order and fragmented transfers of the data blocks are possible.

Processor 53 generates and sends transfer table data to PRAM control 62 to configure PRAM control 62 for parity block generation during DMA transfers from DRAM array 57 to data storage devices 56a1–56d6. The transfer table data includes the addresses of the data blocks in DRAM array 57 which will be moved during the DMA transfer. Device array controllers 56a–56d are bus masters during these transfers. PRAM control 62 monitors the activity on PCI bus 51. When the starting addresses of the data blocks or data block fragments involved in a DMA transfer of a stripe stored in DRAM array 57 match the transfer table entry range (computed from the bus address and the mask bits of the corresponding transfer table entries) corresponding to the stripe, PRAM control 62 computes the parity block using the data words loaded from the PCI bus 51 as they are transferred to device array controllers 56a–56d. The hardware for loading data words from PCI bus 51 is included in PRAM control 62.

First and second parity memories, SRAM0 60 and SRAM1 61, are coupled to PRAM control 62. These equally sized memories are used to store parity generation data words during the parity block generation process. Preferably, high speed static random access memories will be used for SRAM0 60 and SRAM1 61.

Valid contents memory 63 tracks which one of SRAM0 60 or SRAM1 61 contains the valid contents used in the parity block computation. The valid contents memory 63 stores a single bit, referred to as a valid contents bit, for each data word which can be stored in the address space of one of the static random access memories SRAM0 60 or SRAM1 61. The state of the valid contents bit indicates which of SRAM0 60 and SRAM1 61 contains the parity generation data of interest for the corresponding word in the address space. The width of a word in the valid contents memory 63 is selected based upon the desired number of data words to be processed for each valid contents memory word read. For example, a valid contents memory width of 16 bits would allow 16 words of a block fragment to be processed by PRAM control 62 for each valid contents memory word read.

The second embodiment of the PRAM control 62 supports in order fragmented transfers of data blocks. Internal to PRAM control 62, the storage locations in the parity memories 60, 61 which have been used for the storage of data words are tracked during computation of the parity block using a top counter 26. As one of the parity memories 60, 61 are loaded with data words as the first data block is transferred, the top counter indicates which portions of SRAM0 60 or SRAM1 61 have not yet been loaded with data words from this first block. Addresses in SRAM0 60 or SRAM1 61 below the value of the top counter have been loaded with the data words from the first block transferred. Those addresses at the address of the top counter have not yet been loaded with data words during the transfer of the first data block. When a subsequent fragment of a data block in the stripe is transferred over PCI bus 51, the address range of the fragment and the value of the top counter indicates whether the fragment is written directly into the appropriate parity memory 60, 61 or if an exclusive OR operation is required with parity generation data stored in one of the parity memories.

Figure 9:
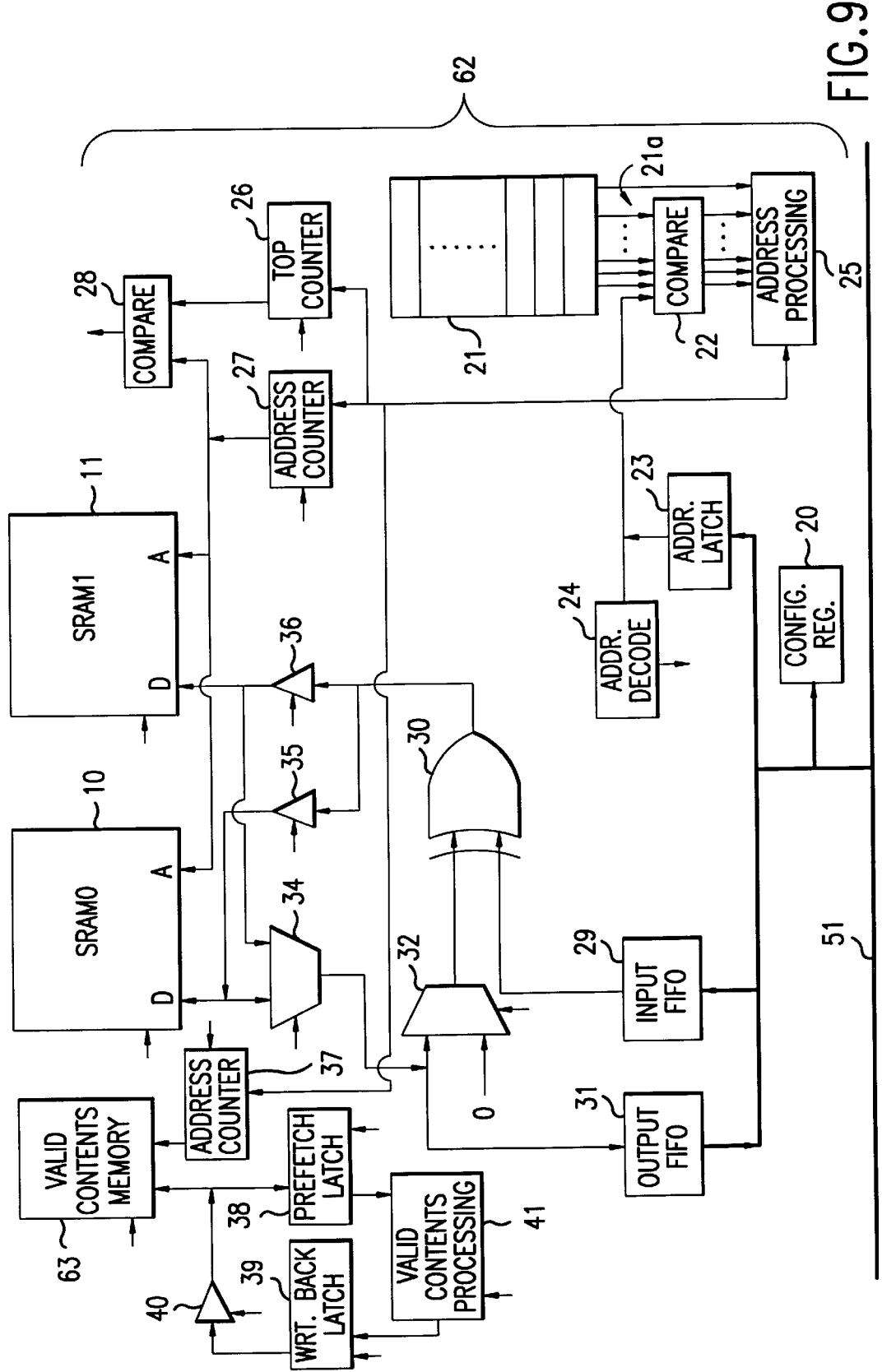
FIG. 9 is a block diagram showing the basic elements of the parity generation and control unit of the second embodiment of the parity block generation apparatus.

Shown in FIG. 9 is a simplified block diagram of PRAM control 62 for the implementation which will perform an in order transfer with fragmentation of the data blocks. In this implementation, PRAM control 62 is connected to PCI bus 51. The functions of the blocks corresponding to those in FIG. 8 are the same. The explanation of the functions of these blocks will not be repeated. A valid contents memory 63 stores a bit corresponding to each of the parity generation data words in the memory space of the parity memories 60, 61. The data and address inputs, labeled "D" and "A" respectively are indicated. Valid contents memory address counter 37 points to the location in the valid contents memory 63 containing the valid contents memory word corresponding to the next group of data words to be processed. The lower order bits of the address input to valid contents memory address counter 37 are masked so that valid contents memory address counter 37 is incremented only after a group of data words corresponding to a valid contents memory word have been processed during parity block generation.

The prefetch latch 38 contains the valid contents memory word corresponding to the next group of data words to be processed during parity block generation. Write back latch 39 contains the updated valid contents memory word corresponding to the most recently processed group of data words. The bits of the valid contents memory word have been modified to reflect which parity memory 60, 61 contains the valid contents. Buffer 40 connects the output of the write back latch 39 to the data input of the valid contents memory 63 when the updated valid contents memory word is written into the valid contents memory 63. The valid contents processing functional block 41 changes the bits in the valid contents memory word as the data words are processed to reflect the parity memory 60, 61 which contains the valid contents.

Figure 6A:
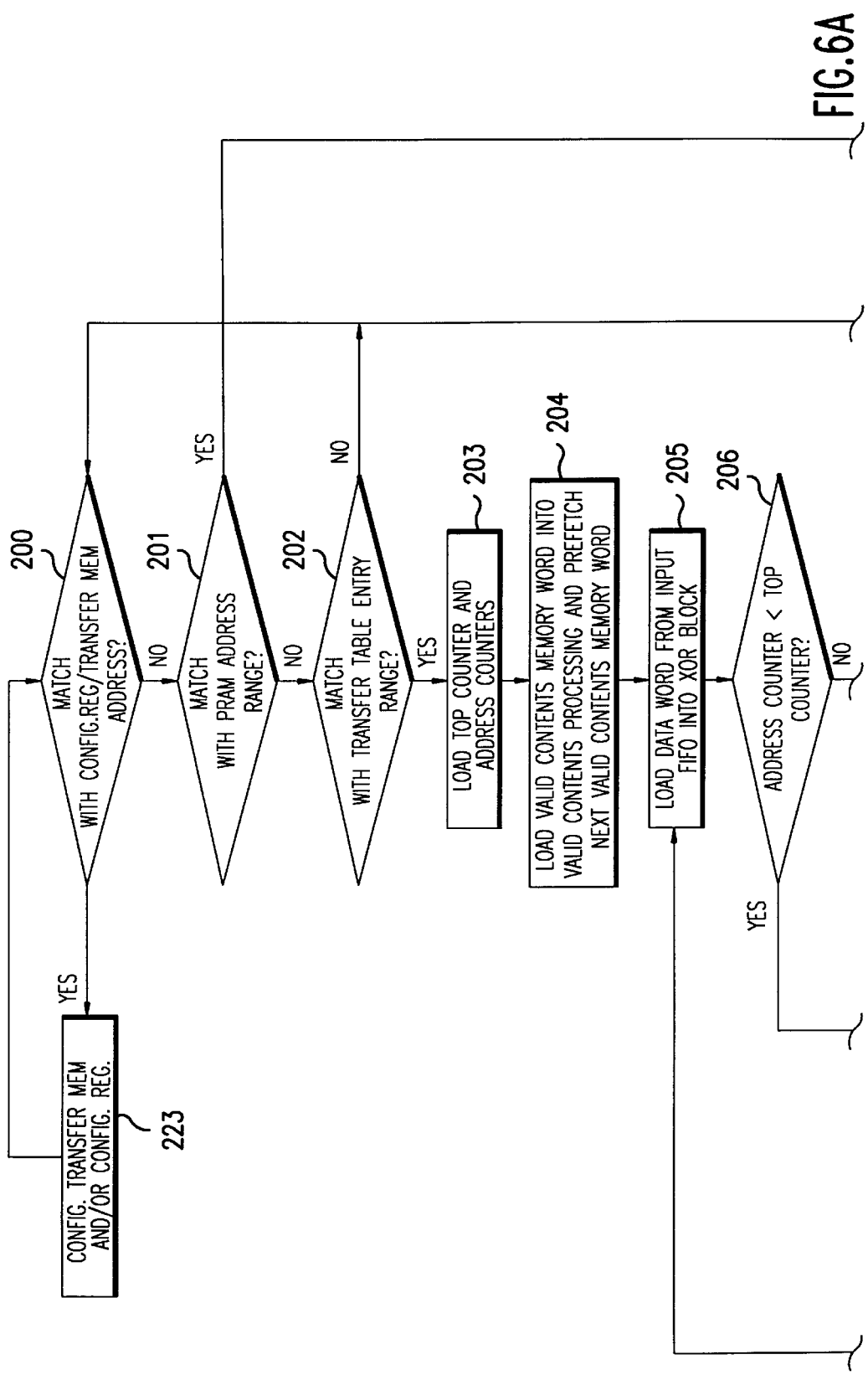
FIG. 6 is a flow chart of a second method of parity block generation utilizing the second embodiment of the parity block generation apparatus.
Figure 6B:
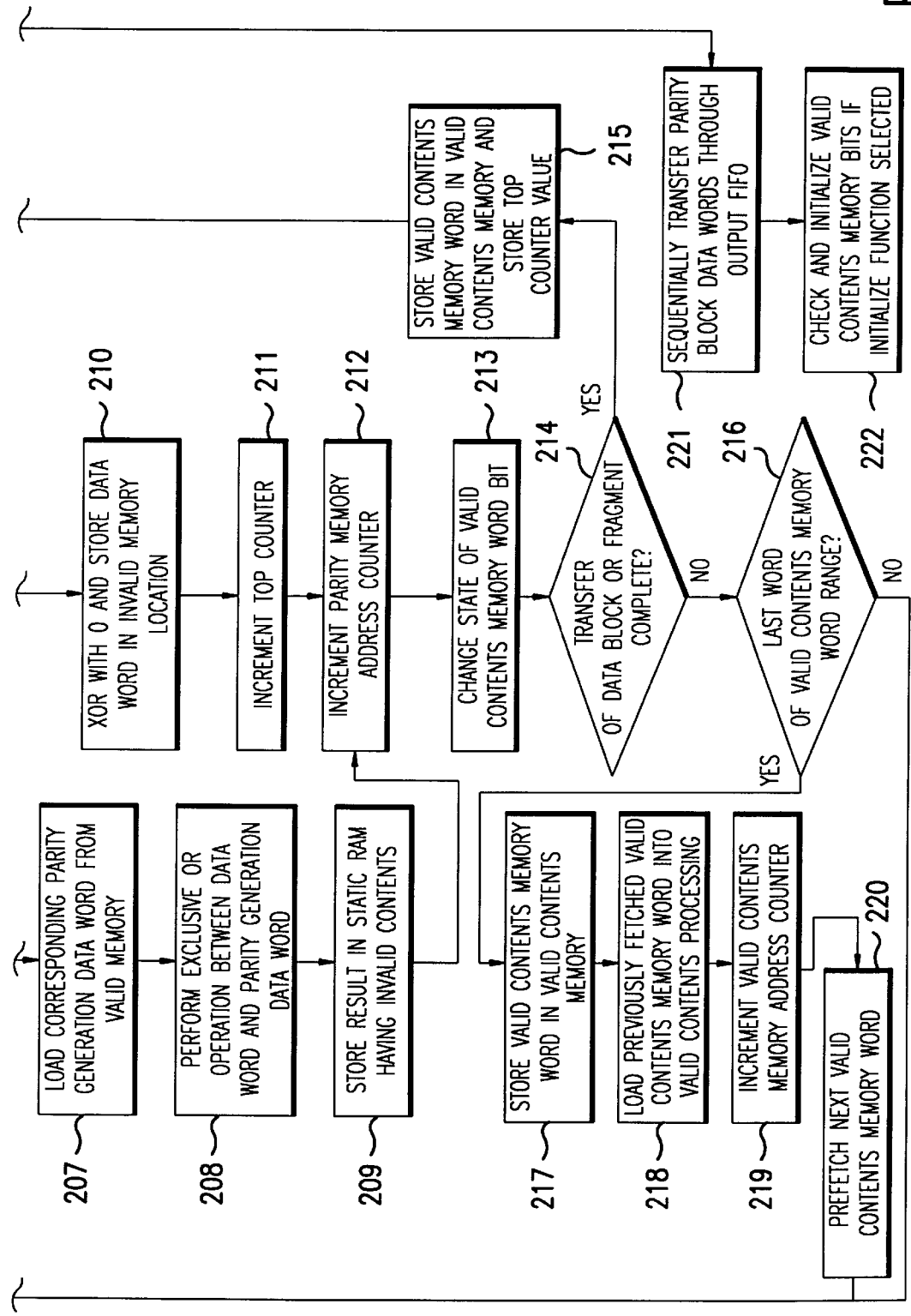

A flowchart for a second method of parity block generation using the second embodiment of the parity generation apparatus is shown in FIG. 6. For the purpose of discussing the second method of parity block generation, it will be assumed that the transfer of the data blocks in the stripe is fragmented and the transfer is done in order. Data transferred from the host computer is initially stored in DRAM array 57. After sufficient data has accumulated in DRAM array 57, stripes are transferred between DRAM array 57 and data storage devices 56a1–56d6. Transfers over the PCI bus 51 follow the pattern of: arbitration for control of the bus by the bus master, placement of the starting address of the data block or data block fragment to be transferred on the bus by the bus master, and successive placement of the data words of the block or fragment on the bus by the target device. For these transfers the bus master is one of the device array controllers 56a–56d and the slave device is DRAM array 57.

Initially, processor 53 determines 200 if transfer memory 21 or configuration register set 20 in PRAM control 62 are being addressed. If either or both of transfer memory 21 and configuration register set 20 are addressed, as applicable, transfer memory 21 is configured 223 by loading the n sets of data each containing a bus address value, a set of mask bits, a parity memory base address, which also serves as an initial top counter value, and configuration register set 20 is configured 223 by loading with configuration data. Then, control is returned to step 200 to check the next address placed on PCI bus 51. If it is determined in step 200 that neither transfer memory 21 or configuration register set 20 have been addressed, then PRAM control 62 determines 201 if the addresses which appear on PCI bus 51 correspond to addresses of locations within parity memories 60, 61. If a match is not detected, then PRAM control 62 determines 202 if the address which appears on PCI bus 51 are within a transfer table entry range. If a match is not detected, control returns to step 200 and this loop is repeated. If a match with a transfer table entry range is detected, PRAM control 62 loads 203 the top counter 26 and parity memory and valid contents memory address counters 27, 37 with the appropriate values. Next, PRAM control 62 loads 204 the valid contents memory word corresponding to the address which was present on PCI bus 51 into valid contents processing 41 through pre-fetch latch 38 and loads a pre-fetched valid contents memory word with the successive address into prefetch latch 38. Then, PRAM control 62 loads 205 the data word from input FIFO register 29 into XOR block 30. Input FIFO register 29 loads data words as they are transferred over PCI bus 51 to device array controllers 56a–56d. Data words are pre-loaded into input FIFO register 29 at the start of a transfer before a match is detected so that data words will be available to begin computation of the parity data when a match is detected. If no match is detected between the transfer table entry range and the address appearing on PCI bus 51 prior to the start of the data word transfers, the data words will be discarded.

Next, PRAM control 62 determines 206 if the location in the invalid memory corresponding to the data word in XOR block 30 has had data words previously stored in it. This is done by comparing the value in parity memory address counter 27 to the value in top counter 26 using the compare functional block 28. If the parity memory address counter value is less than the top counter value this indicates that data words have been previously stored in that location. If the value in parity memory address counter 27 is equal to the top counter value, the data word undergoes an exclusive OR operation with a digital value of 0 and is stored 210 in the invalid memory location. Next, the top counter 26 is incremented 211.

If the parity memory address counter value is less than the top counter value, the corresponding parity generation data word is loaded 207 from the valid memory as determined by the valid contents bits. Then, an exclusive OR operation is performed 208 using the parity generation data word and the data word as operands. The result of the exclusive OR operation is stored 209 in the location in the invalid memory location corresponding to the location of the parity generation data word loaded from the valid memory.

After either incrementing 211 the top counter 26 or storing 209 the result of the exclusive OR operation, the parity memory address counter 27 is incremented 212 to point to the next pair of locations within parity memories 60, 61 used to store and load parity generation data words. Then, the state of the corresponding valid contents memory word bit is changed 213 to indicate which of the parity memories 60, 61 now contains the valid parity generation data word. Next, PRAM control 62 determines 214 if the transfer of the data block or data block fragment, is complete by checking input FIFO register 29. If it is complete, the valid contents memory word in valid contents processing 41 is moved to write back latch 39 and stored 215 in valid contents memory 63. In addition, the value of the top counter is stored 215 in transfer memory 21 Then, control is returned to step 200.

If the transfer of the data block or data block fragment is not complete, PRAM control 62 determines 21 6 if the parity generation data word most recently processed is the last word of the range of parity generation data words included in the valid contents memory word. If this is the case, the valid contents memory word contained in valid contents processing 41 is transferred into write back latch 39 and then stored 217 into valid contents memory 63. Then, the previously fetched valid contents memory word contained in pre-fetch latch 38 is loaded 218 into valid contents processing 41. Next, the valid contents memory address counter 37 is incremented 219 to point to the valid contents memory word having the successive address of the valid contents memory word most recently transferred into valid contents processing 41. Then, this valid contents memory word is transferred 220 from valid contents memory 63 into pre-fetch latch 38. If the parity generation data word most recently processed is not the last word of the range of parity generation data words included in the valid contents memory word, control is returned to step 205.

When generation of the parity block has been completed, PRAM control 62 monitors addresses placed on PCI bus 51 while executing steps 200, 201 and 202. The parity block is transferred from the one of the parity memories 60, 61 in which it resides to one of the data storage devices 56a1–56d6 under control of the DMA master. When the DMA master performs a read access to the parity memories 60, 61 by placing an address on the PCI bus 51 which is within the parity memory base address range, PRAM control 62 sequentially transfers 221 parity block data words from the valid parity memory through output FIFO 31 to PCI bus 51. PRAM control 62 includes a selectable valid contents bit initialization feature. If the parity memories are used as cache memory, the valid contents memory bits are not initialized during reads of the valid contents memory. If PRAM control 62 is set for valid contents memory bit initialization, PRAM control 62 checks and then initializes 222 the state of the corresponding valid contents memory bit in preparation for the transfer of the next stripe of data as parity block data words are transferred to the PCI bus 51.

The parity generation data words will move between SRAM0 60 and SRAM1 61 as data words of the data blocks of the stripe are transferred over the PCI bus 51. As was the case with the first embodiment of the parity generation apparatus, alternately dedicating SRAM0 60 and SRAM1 61 for writing and reading as the parity block generation proceeds, allows data transfers between PRAM control 62 and the static RAMs to be performed sufficiently fast to generate the parity block as the stripe data is transferred over the PCI bus 51. In an environment of high speed data transfer over PCI bus 51, this provides an improvement in data transfer performance over the prior art methods using a single static RAM for the PRAM memory.

When all of the data words of the stripe are finished transferring, the resulting parity block resides entirely in one of the static RAMs and the valid contents bits are all in the same state because the initial data block fragments are loaded into the same static RAM and computation of each word of the parity block requires the same number of exclusive OR operations. Because of this, it is only absolutely necessary to perform initialization of the valid contents memory bits after power-on, after a transfer aborts, or if the block size is changed. However, not initializing the valid contents bits after each stripe transfer would require a method to track the association between the state of the valid contents bits and the parity memories.

A third embodiment of the parity generation apparatus which uses the third embodiment of PRAM control 62 employs an additional bit in the valid contents memory 63 for tracking which locations of the static RAMs have not yet been initially written to during the computation of the parity block. This additional bit, referred to as a first access bit, is paired with the valid contents bit used to track which of SRAM0 60 and SRAM1 61 is the valid memory during the parity block computation. Use of this first access bit allows transfer of the fragments of the blocks in the stripe to be done in arbitrary order, unlike the second embodiment which used the top counter and required in order transfers.

Figure 10:
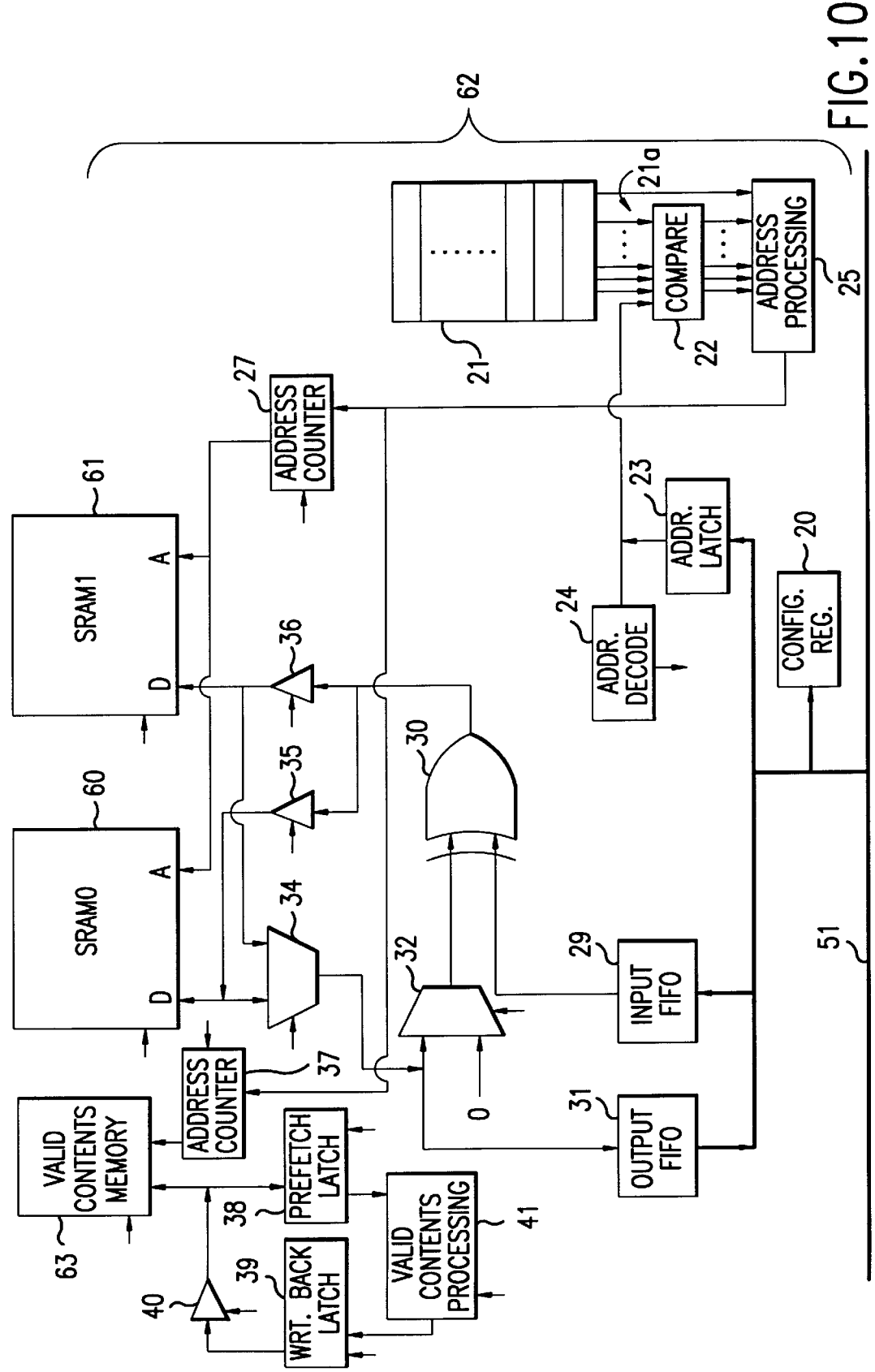
FIG. 10 is a block diagram showing the basic elements of the parity generation and control unit of the third embodiment of the parity block generation apparatus.

Shown in FIG. 10 is a block diagram of the internal functional blocks of the third embodiment of PRAM control 62. The functions of the blocks corresponding to those in FIGS. 8 and 9 are the same. The explanation of the functions of these blocks will not be repeated. By pairing a first access bit with each of the valid contents bits, the need for top counter 26 is eliminated. This in turn eliminates the need for the compare functional block 28. In the third embodiment of PRAM control 62 the valid contents processing functional block 41 includes the capability to change the first access bits as well as the valid contents bits as data words are processed. The first access bits indicate to which addresses in the address range of the parity memories 60, 61 data words have been previously written during generation of the parity block. Each of the embodiments of the PRAM control are preferably implemented on a single application specific integrated circuit.

Figure 7A:
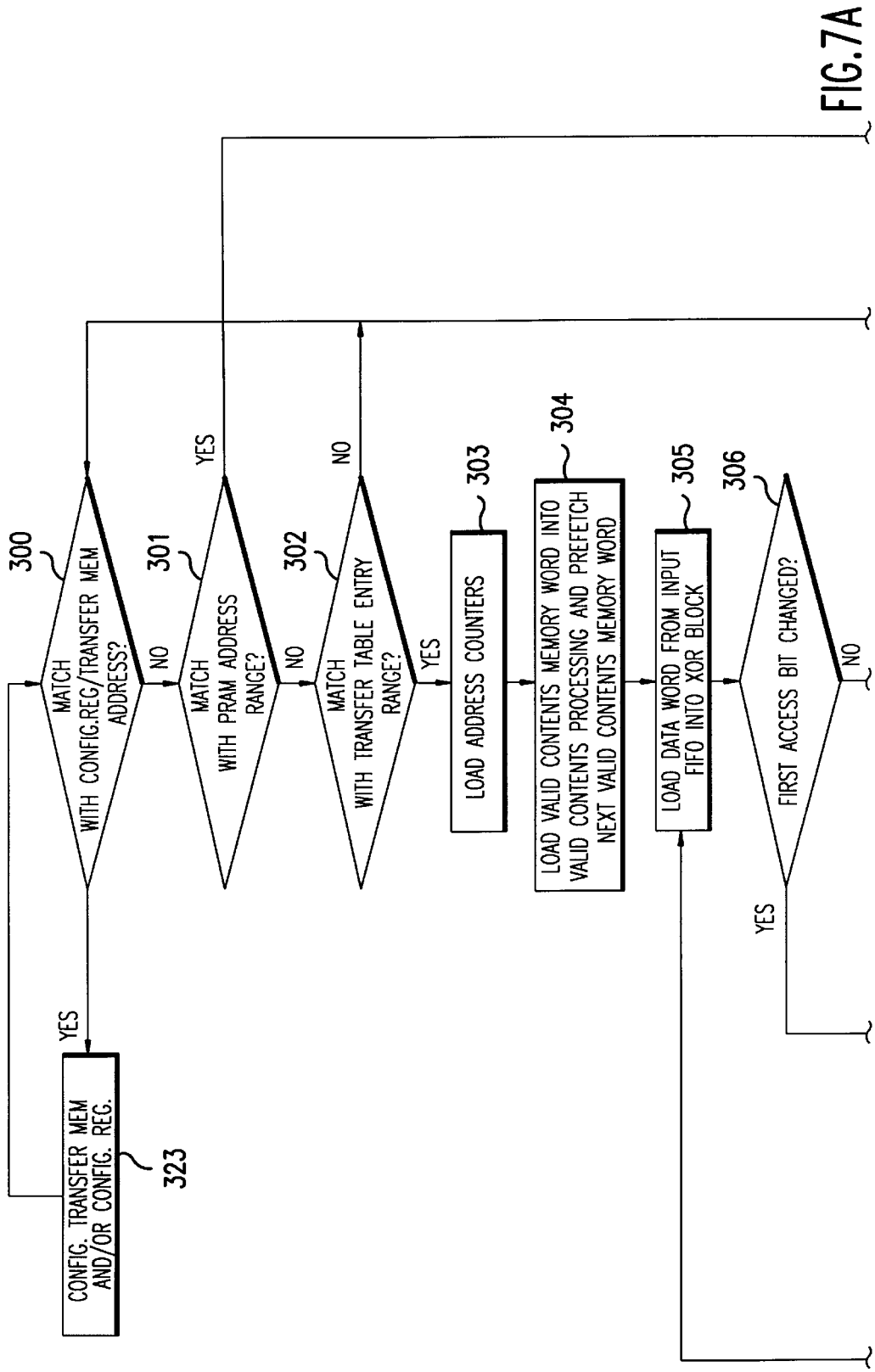
FIG. 7 is a flow chart of a third method of parity block generation utilizing a third embodiment of the parity block generation apparatus.
Figure 7B:
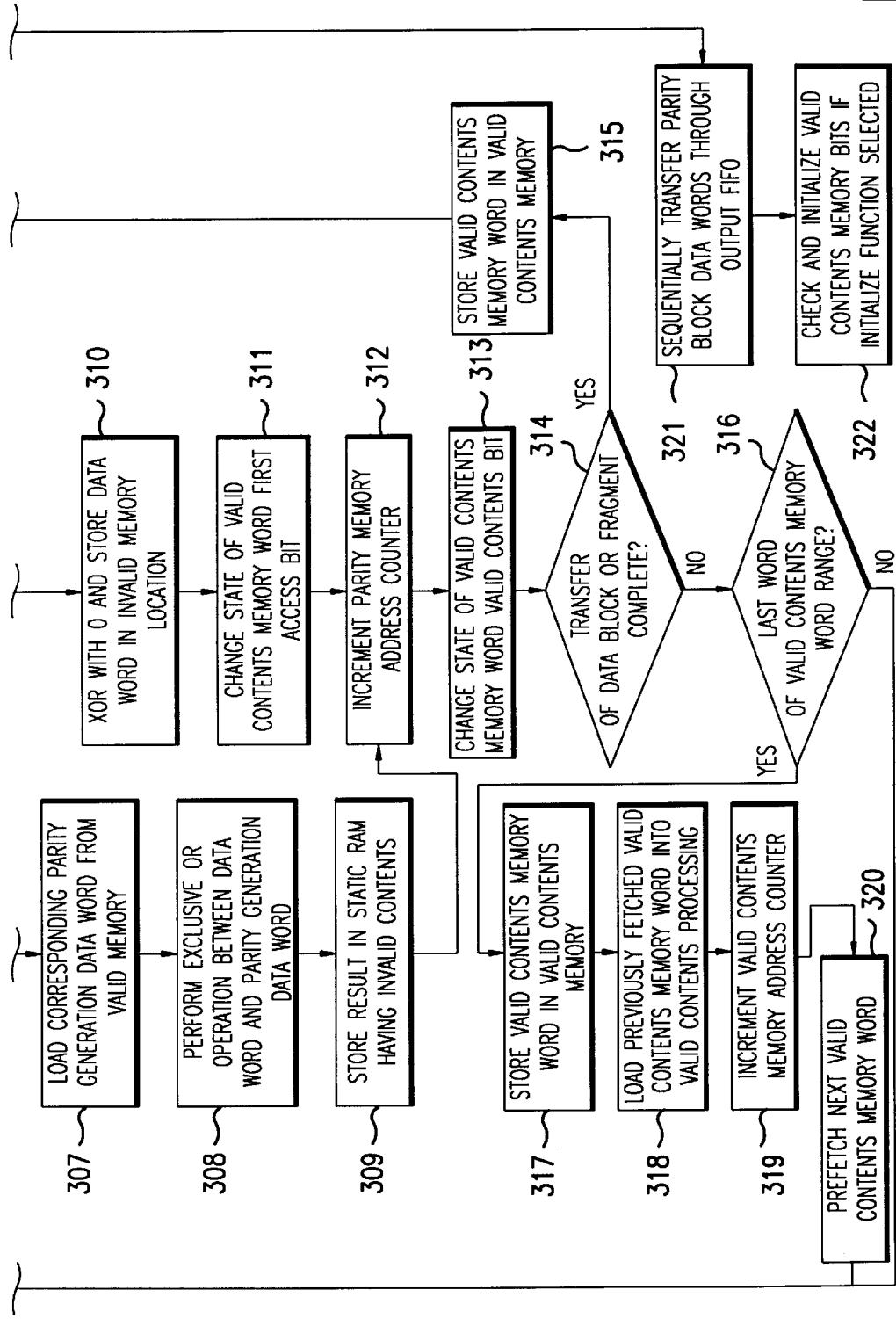

A flowchart for a third method of parity block generation, using the third embodiment of the parity block generation apparatus, is shown in FIG. 7. As was the case for the second method of parity block generation, computation of the parity block is done as the data stripe is transferred over the PCI bus 51. For the purpose of discussing the third method of parity block generation, it will be assumed that the transfer of the data blocks in the stripe is fragmented and the transfer is not done in order. Data transferred from the host computer is initially stored in DRAM array 57. After sufficient data has accumulated in DRAM array 57, stripes are transferred between DRAM array 57 and data storage devices 56a1–56d6. The protocol followed for data transfer over the PCI bus 51 is the same as was detailed for the second method of parity block generation.

Initially, processor 53 determines 300 if transfer memory 21 or configuration register set 20 in PRAM control 62 are being addressed. If either or both of transfer memory 21 and configuration register set 20 are addressed, as applicable, transfer memory 21 is configured 323 by loading the n sets of data each containing a bus address value, a set of mask bits, a parity memory base address, which also serves as an initial top counter value, and configuration register set 20 is configured 323 by loading with configuration data. Then, control is returned to step 300 to check the next address placed on PCI bus 51. If it is determined in step 300 that neither transfer memory 21 or configuration register set 20 have been addressed, then PRAM control 62 determines 301 if the addresses which appear on PCI bus 51 correspond to addresses of locations within parity memories 60, 61. If a match is not detected, then PRAM control 62 determines 302 if the address which appears on PCI bus 51 are within a transfer table entry range. If a match is not detected, control returns to step 301 and this loop is repeated. If a match is detected, PRAM control 62 loads 303 the parity memory and valid contents memory address counters 27, 37 with the appropriate values. Next, PRAM control 62 loads 304 the valid contents memory word corresponding to the address which was present on PCI bus 51 into valid contents processing 41 through pre-fetch latch 38 and loads a pre-fetched valid contents memory word with the successive address into pre-fetch latch 38. Then, PRAM control 62 loads 305 the data word from input FIFO register 29 into XOR block 30. Data words are pre-loaded into input FIFO register 29 at the start of a transfer before a match is detected so that data words will be available to begin computation of the parity data when a match is detected. If no match is detected between the transfer table entry range and the address appearing on PCI bus 51 prior to the start of the data word transfers, the data words will be discarded.

Next, PRAM control 62 determines 306 if the location in the invalid memory corresponding to the data word in XOR block 30 has had data words previously stored in it. This is done by checking the state of the first access bit associated with the location in the invalid memory. If this bit has been changed from its initial state, it indicates that a data word has been stored in one of the pair of corresponding locations in the parity memories 60, 61. If the first access bit has not changed from its initial state, it indicates that a data word has not been stored in either of the pair of corresponding locations in the parity memories 60, 61. If the first access bit has not changed, the data word undergoes an exclusive OR operation with a digital value of 0 and is stored 310 in the invalid memory location. Then, the state of the associated first access bit of the valid contents memory word is changed 311.

If the first access bit has changed, the corresponding parity generation data word is loaded 307 from the valid memory as determined by the valid contents bits. Then, an exclusive OR operation is performed 308 using the parity generation data word and the data word as operands. The result of the exclusive OR operation is stored 309 in the location in the invalid memory location corresponding to the location of the parity generation data word loaded from the valid memory.

After either changing the state of the first access bit 311 or storing 309 the result of the exclusive OR operation, the parity memory address counter 27 is incremented 312 to point to the next pair of locations within parity memories 60, 61 used to store and load parity generation data words. Then, the state of the corresponding valid contents memory word bit is changed 313 to indicate which of the parity memories 60, 61 now contains the valid parity generation data word. Next, PRAM control 62 determines 314 if the transfer of the data block or data block fragment, is complete by checking input FIFO register 29. If it is complete, the valid contents memory word (which includes the first access bits and the valid contents bits) in valid contents processing 41 is moved to write back latch 39 and stored 315 in valid contents memory 63. Then control is returned to step 301.

If the transfer of the data block or data block fragment is not complete, PRAM control 62 determines 316 if the parity generation data word most recently processed is the last word of the range of parity generation data words included in the valid contents memory word. If this is the case, the valid contents memory word contained in valid contents processing 41 is transferred into write back latch 39 and then stored 317 into valid contents memory 63. Then, the previously fetched valid contents memory word contained in pre-fetch latch 38 is loaded 318 into valid contents processing 41. Next, the valid contents memory address counter 37 is incremented 319 to point to the valid contents memory word having the successive address of the valid contents memory word most recently transferred into valid contents processing 41. Then, this valid contents memory word is transferred 320 from valid contents memory 63 into pre-fetch latch 38. If the parity generation data word most recently processed is not the last word of the range of parity generation data words included in the valid contents memory word, control is returned to step 305.

When generation of the parity block has been completed, PRAM control 62 monitors addresses placed on PCI bus 51 while executing steps 300, 301, and 302. The parity block is transferred from the one of the parity memories 60, 61 in which it resides to one of the data storage devices 56a1–56d6 under control of the DMA master. When the DMA master places an address on the PCI bus 51 which is within the parity memory base address range, PRAM control 62 sequentially transfers 321 parity block data words from the valid parity memory through output FIFO 31 to PCI bus 51. PRAM control 62 includes a selectable valid contents bit initialization feature. If the parity memories are used as cache memory, the valid contents memory bits are not initialized during reads of the valid contents memory. If PRAM control 62 is set for valid contents memory bit initialization, PRAM control 62 checks and then initializes 322 the state of the corresponding valid contents memory bit in preparation for the transfer of the next stripe of data as parity block data words are transferred to the PCI bus 51.

As this loop is executed, fragments of the data blocks in the stripe are transferred over the PCI bus and the computation of the parity block for the stripe proceeds. The data block fragments can be transferred in arbitrary order with respect to their location in the data block address range. The fragments of the intermediate results of the parity block computation, possibly as small as single data words, will switch back and forth between SRAM0 60 and SRAM1 61 as fragments of the data blocks of the stripe are transferred over the PCI bus 51. When all of the data words of the stripe are finished transferring, the resulting parity block resides entirely in one of the parity memories and the valid contents bits are all in the same state because the initial data block fragments are loaded into the same static RAM and computation of each word of the parity block requires the same number of exclusive OR operations. For the same reason, all of first access bits are in a state opposite the state at the beginning of the stripe transfer. If a flip/flop in PRAM control 62 is used to track the definition applied to the state of the first access bits, it is only necessary to perform initialization of the first access bits after power-on, after a transfer aborts, or if the block size is changed.

Each of the disclosed embodiments of the PRAM control supports the concurrent generation of parity blocks for multiple stripes. The parity memories are partitioned into n blocks corresponding to each of the n sets of data values stored in the transfer table. For the first and second embodiments of the PRAM control, the top counter is loaded with the parity memory base address stored in the transfer table before generation of the parity block for the corresponding stripe begins. When the transfer of a portion of a stripe completes, the current value of the top counter is saved in the transfer table. In preparation for the transfer of a portion of another stripe, the top counter value is loaded from the transfer table into the top counter. This allows parity block generation for multiple stripes while requiring only a single top counter. For the second and third embodiments of the PRAM control, the valid contents memory is partitioned into n blocks corresponding to the n blocks of parity memory. During generation of a parity block, the corresponding block in the valid contents memory is used.

U.S. Pat. No. 5,289,418 issued to Youngerth discloses a dedicated parity generation circuit which allows parity generation to be performed independent of a CPU. The circuit uses combinational logic to accomplish successive exclusive OR operations between the contents of a memory array and a data word and then returns the result to the memory array. In contrast, the disclosed embodiments of the parity block generation apparatus employ a pair of memories and, for corresponding storage locations in the memories, alternately store the intermediate results in the memories as the parity block generation proceeds. The Youngerth patent does not disclose the use of a pair of memories for alternately storing intermediate results during parity block generation.

U.S. Pat. No. 5,206,943 issued to Callison et al. describes a parity generation engine which accomplishes generation of a parity word using an array of dedicated exclusive OR gates operating on each bit of the data bus. The Callison et al. patent does not describe the use of a pair of alternate memories to alternately store intermediate results of the parity generation.

U.S. Pat. No. 5,345,565, issued Jibbe et al. discloses an array storage systems which uses an array of exclusive OR circuits to generate parity data in parallel and uses the array of exclusive OR circuits to verify that data stored in a RAID-1 format is correct. Jibbe et al. does not disclose the use of a pair of alternate memories to alternately store intermediate results of the parity generation.

Although several embodiments of the invention have been illustrated, and their forms described, it is readily apparent to those skilled in the art that various modifications may be made therein without departing from the spirit of the invention or from the scope of the appended claims.

What is claimed is:

1. An apparatus for generating parity data from a plurality of data words, comprising:

a first parity memory including a first set of memory locations;

a second parity memory including a second set of memory locations and;

a parity generation and control unit arranged for receiving said plurality of data words and coupled to said first and said second parity memory, said parity generation and control unit for storing and loading parity generation data words to and from said first and said second parity memory so that said memory locations of said first set of memory locations and said memory locations of said second set of memory locations alternate between sending and receiving said parity generation data words to and from said parity generation and control unit during the generation of said parity data.

2. The apparatus as recited in claim 1, wherein:

said parity generation and control unit includes a means for selectively performing a succession of exclusive OR operations yielding said parity generation data words;

said parity generation and control unit includes a means for selectively storing and for selectively loading said parity generation data words to and from said first and said second parity memory, said means for selectively storing and for selectively loading coupled to said means for performing a succession of exclusive OR operations; and said parity generation and control unit includes a means for receiving said plurality of data words from a bus and a means for sending said parity generation data words to said bus, said means for receiving coupled to said means for selectively performing a succession of exclusive OR operations, said means for sending coupled to said means for selectively storing and selectively loading.

3. The apparatus as recited in claim 2, wherein:

said parity generation and control unit includes a transfer memory for storing n sets of values, each of said n sets of values includes a bus address value, a parity memory base address, and a set of compare mask bits, each of said sets of compare mask bits applied to corresponding said bus address values forms a transfer table entry range for determining those of said plurality of data words received by said means for receiving used for generation of said parity data, each of said parity memory base addresses defines a starting address of a corresponding pair of ranges of storage locations in said first and said second parity memory.

4. The apparatus as recited in claim 3, wherein:

said means for selectively performing a succession of exclusive OR operations performs exclusive OR operations using a pair of operands selected from the group consisting of one of said plurality of data words and a digital value of zero, or one of said plurality of data words and corresponding one of said parity generation data words.

5. The apparatus as recited in claim 4, further comprising:

a valid contents memory coupled to said parity generation and control unit, said valid contents memory for containing valid contents bits indicating said storage locations in said first and said second parity memory containing valid of said parity generation data words.

6. The apparatus as recited in claim 5, wherein:

said parity generation and control unit includes a means for changing said valid contents bits in said valid contents memory coupled to said valid contents memory.

7. The apparatus as recited in claim 6, wherein:

a redundant array storage system includes said bus.

8. The apparatus as recited in claim 7, wherein:

said redundant array storage system transfers successive of said plurality of data words over said bus having successive addresses, said means for selectively storing and for selectively loading for storing said plurality of data words to said first and said second parity memory determined from said valid contents bits, said storage locations determined from said addresses and corresponding said parity memory base address; and said parity generation and control unit includes a top counter coupled to said means for selectively storing and for selectively loading for indicating said storage locations in said first and said second parity memory previously used for storage of said parity generation data words, each of said n sets of values includes a top counter value.

9. The apparatus as recited in claim 7, wherein:

said valid contents memory stores first access bits indicating storage locations in said first and said second parity memory previously used for storage of said parity generation data words.

10. The apparatus as recited in claim 9, wherein:

an application specific integrated circuit includes said parity generation and control unit.

11. In a redundant array storage system including a bus, a plurality of data storage devices, a parity generation and control unit, a first and a second parity memory for storing a plurality of parity generation data words, and a means for determining which of said first and said second parity memory contains valid contents and which of said first and said second parity memory contains invalid contents, a method for generating parity data from a plurality of data words during transfer of said data words over said bus, said method comprising the steps of:

loading a first one of said plurality of parity generation data words from the one of said first and said second parity memory containing said valid contents into said parity generation and control unit;

loading a first one of said plurality of data words from said bus into said parity generation and control unit;

performing an exclusive OR operation using said first one of said plurality of parity generation data words and said first one of said plurality of data words as operands, yielding a result; and storing said result in the one of said first and said second parity memory containing invalid contents.

12. The method as recited in claim 11, further comprising the step of:

storing said first one of said plurality of parity generation data words in the one of said first and said second parity memory having invalid contents, said step of storing said first one of said plurality of parity generation data words occurring prior to said step of loading said first one of said plurality of parity generation data words from one of said first and said second parity memory.

13. The method as recited in claim 12, further comprising the step of:

loading said first one of said plurality of parity generation data words from said bus into said parity generation and control unit, said step of loading said first one of said plurality of parity generation data words occurring prior to said step of storing said first one of said plurality of parity generation data words in the one of said first and said second parity memory having invalid contents.

14. The method as recited in claim 13, in which said means for determining which of said first and said second parity memory contains valid contents and which of said first and said second parity memory contains invalid contents includes a valid contents memory having a first set of storage locations for valid contents bits, wherein:

said step of loading said first one of said plurality parity generation data words from one of said first and said second parity memory includes the step of selecting, using said valid contents bits, which one of said first and said second parity memory contains said valid contents; and said step of storing said result includes the step of determining, using said valid contents bits, which one of said first and said second parity memory contains said invalid contents.

15. In a redundant array memory system, an apparatus for generating a parity block from a plurality of data blocks each including a plurality of data words, said apparatus comprising:

a means for selectively performing exclusive OR operations yielding parity generation data words;

a means for loading arranged to receive said plurality of data words from said redundant array memory system and coupled to said means for performing exclusive OR operations;

a first parity memory including a first set of memory locations;

a second parity memory including a second set of memory locations; and a means for selectively storing and selectively loading arranged for receiving said parity generation data words from said means for performing exclusive OR operations, said means for selectively storing and selectively loading arranged for storing and loading said parity generation data words to and from said first and said second parity memory so that said memory locations of said first set of memory locations and said memory locations of said second set of memory locations alternate between sending and receiving said parity generation data words to and from said means for selectively storing and loading during the generation of said parity block with said means for selectively storing and selectively loading arranged for sending said parity generation data words to said means for selectively performing exclusive OR operations.

16. The apparatus as recited in claim 15, further comprising:

a means for storing n sets of values, each of said n sets of values includes a bus address value, a parity memory base address, and a set of compare mask bits, each of said sets of compare mask bits applied to corresponding said bus address values forms a transfer table entry range for determining those of said plurality of data words loaded by said means for loading used for generation of said parity block, each of said parity memory base addresses defines a starting address of a corresponding pair of ranges of storage locations in said first and said second parity memory.

17. The apparatus as recited in claim 16, wherein:

said means for selectively storing and loading stores and loads parity generation data words to and from storage locations in said first and said second parity memory included in said pair of ranges.

18. The apparatus as recited in claim 17, further comprising:

a means for indicating storage locations in said first and said second parity memory containing valid of said parity generation data words, said means for indicating coupled to said means for selectively storing and selectively loading.

19. The apparatus as recited in claim 18, further comprising:

a means for determining storage locations in said first and said second parity memory previously used for storage of said plurality of data words.

20. The apparatus as recited in claim 19, wherein:

said means for determining and said means for indicating include a valid contents memory for storing valid contents bits and first access bits.

* * * * *